United States Patent
Venugopal et al.

(10) Patent No.: US 12,362,806 B2
(45) Date of Patent: Jul. 15, 2025

(54) UNIFIED PRECODING AND CHANNEL STATE INDICATION ENHANCEMENT

(71) Applicant: QUALCOMM Incorporated, San Diego, CA (US)

(72) Inventors: Kiran Venugopal, Green Brook, NJ (US); Wooseok Nam, San Diego, CA (US); Tao Luo, San Diego, CA (US); Mostafa Khoshnevisan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 113 days.

(21) Appl. No.: 18/160,922

(22) Filed: Jan. 27, 2023

(65) Prior Publication Data

US 2024/0259071 A1    Aug. 1, 2024

(51) Int. Cl.
*H04B 7/06*   (2006.01)
*H04B 7/0456*   (2017.01)

(52) U.S. Cl.
CPC ......... *H04B 7/0639* (2013.01); *H04B 7/0486* (2013.01); *H04B 7/0626* (2013.01)

(58) Field of Classification Search
CPC ... H04B 7/0639; H04B 7/0486; H04B 7/0626
See application file for complete search history.

(56) References Cited

U.S. PATENT DOCUMENTS

| | | | |
|---|---|---|---|
| 2014/0153427 A1* | 6/2014 | Seo ............................ | H04L 1/20 370/252 |
| 2021/0167830 A1* | 6/2021 | Song ...................... | H04W 72/04 |
| 2023/0088818 A1* | 3/2023 | Chou ..................... | H04L 5/0051 370/329 |
| 2023/0239025 A1* | 7/2023 | Park ....................... | H04L 5/0053 370/329 |
| 2023/0299815 A1* | 9/2023 | Marzban ............... | H04B 7/0632 370/329 |
| 2023/0403051 A1* | 12/2023 | Regev ................... | H04B 7/0421 |
| 2024/0121065 A1* | 4/2024 | Rahman ................ | H04B 7/0456 |
| 2024/0154669 A1* | 5/2024 | Rahman .................... | H04L 5/00 |
| 2024/0154760 A1* | 5/2024 | Lee ........................... | H04B 7/066 |
| 2024/0171350 A1* | 5/2024 | Gao ....................... | H04L 5/0035 |

FOREIGN PATENT DOCUMENTS

| | | | | |
|---|---|---|---|---|
| WO | WO-2023026197 A1 | * | 3/2023 | |
| WO | WO-2023203467 A1 | * | 10/2023 | ........... H04B 7/0632 |
| WO | WO-2023238070 A1 | * | 12/2023 | ............ H04B 7/024 |
| WO | WO-2023244063 A1 | * | 12/2023 | ............ H04B 7/024 |
| WO | WO-2024020965 A1 | * | 2/2024 | ........... H04B 7/0417 |

* cited by examiner

*Primary Examiner* — Jaison Joseph
(74) *Attorney, Agent, or Firm* — Patterson+ Sheridan, L.L.P.

(57) ABSTRACT

Certain aspects of the present disclosure provide techniques for transmitting precoding matrix indicators (PMIs) for rank indications (RIs) and receiving coherent joint transmission (CJT) channels based on the PMIs. A method that may be performed at a user equipment (UE) includes outputting, for transmission, a report comprising a precoding matrix indicator (PMI) for a rank indication (RI); and obtaining, based on the PMI, a coherent joint transmission (CJT) physical downlink shared channel (PDSCH) having a rank, M, less than or equal to the RI.

17 Claims, 24 Drawing Sheets

900 →
• NCJT (SDM-based)
$$\begin{bmatrix} V_A & 0 \\ 0 & V_B \end{bmatrix} \begin{bmatrix} X_A \\ X_B \end{bmatrix} = \begin{bmatrix} V_A X_A \\ V_B X_B \end{bmatrix}$$
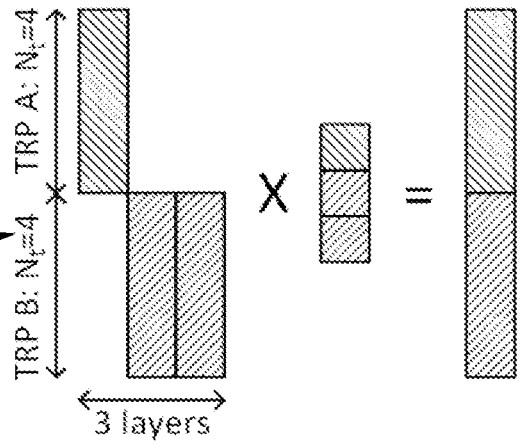
• CJT
$$\begin{bmatrix} V_A \\ V_B \end{bmatrix} \cdot X = \begin{bmatrix} V_A X \\ V_B X \end{bmatrix}$$
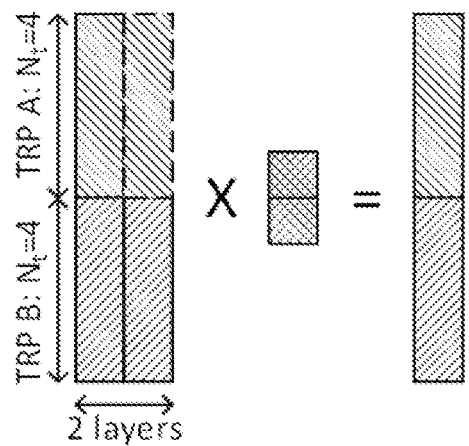
*FIG. 9*

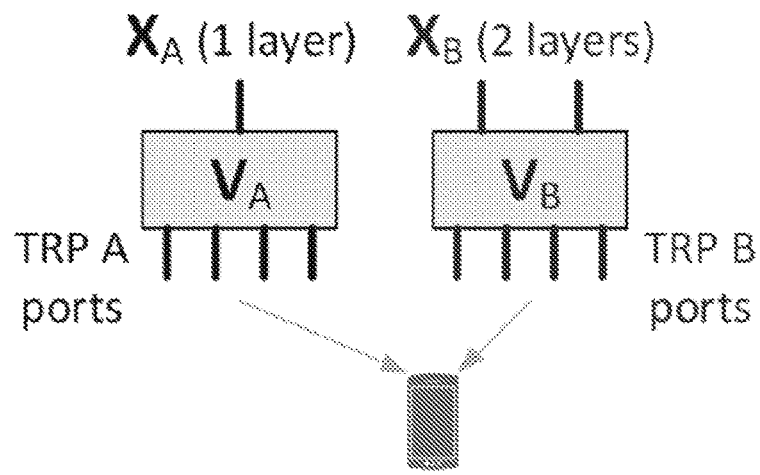
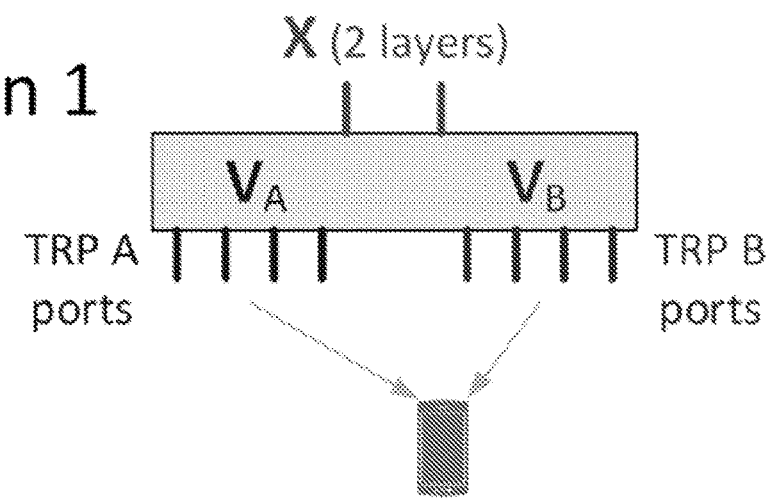
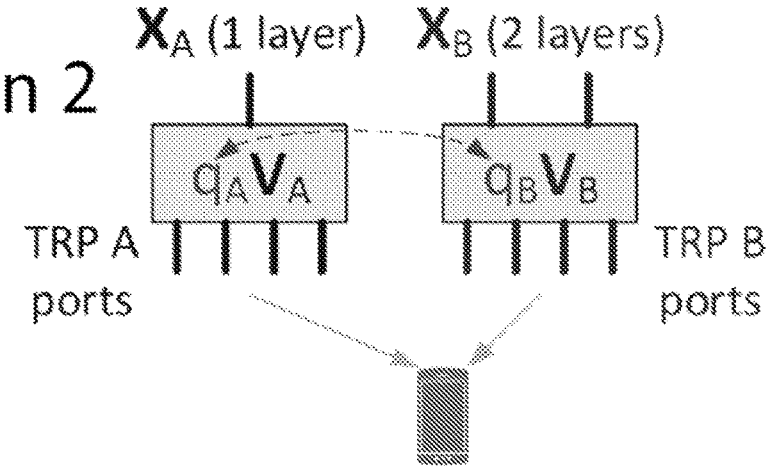
FIG. 10

UNIFIED PRECODING AND CHANNEL STATE INDICATION ENHANCEMENT

BACKGROUND

Field of the Disclosure

Aspects of the present disclosure relate to wireless communications, and more particularly, to techniques for transmitting precoding matrix indicators (PMIs) for rank indications (RIs) and receiving coherent joint transmission (CJT) channels based on the PMIs.

Description of Related Art

Wireless communications systems are widely deployed to provide various telecommunication services such as telephony, video, data, messaging, broadcasts, or other similar types of services. These wireless communications systems may employ multiple-access technologies capable of supporting communications with multiple users by sharing available wireless communications system resources with those users Although wireless communications systems have made great technological advancements over many years, challenges still exist. For example, complex and dynamic environments can still attenuate or block signals between wireless transmitters and wireless receivers. Accordingly, there is a continuous desire to improve the technical performance of wireless communications systems, including, for example: improving speed and data carrying capacity of communications, improving efficiency of the use of shared communications mediums, reducing power used by transmitters and receivers while performing communications, improving reliability of wireless communications, avoiding redundant transmissions and/or receptions and related processing, improving the coverage area of wireless communications, increasing the number and types of devices that can access wireless communications systems, increasing the ability for different types of devices to intercommunicate, increasing the number and type of wireless communications mediums available for use, and the like. Consequently, there exists a need for further improvements in wireless communications systems to overcome the aforementioned technical challenges and others.

SUMMARY

One aspect provides a method for wireless communications at a user equipment (UE). The method includes outputting for transmission a report comprising a precoding matrix indicator (PMI) for a rank indication (RI); and obtaining, based on the PMI, a coherent joint transmission (CJT) physical downlink shared channel (PDSCH) having a rank, M, less than or equal to the RI.

Another aspect provides a method for wireless communications at a user equipment (UE). The method includes outputting for transmission a report comprising one or more precoding matrix indicators (PMIs), each PMI corresponding to a different rank indication (RI); and obtaining a coherent joint transmission (CJT) physical downlink shared channel (PDSCH) having a rank, M, wherein the PDSCH is obtained based on the PMI corresponding to the RI equal to M.

Yet another aspect provides a method for wireless communications at a user equipment (UE). The method includes obtaining a transmission control indicator (TCI) codepoint indicating a TCI state during a first slot; and obtaining one or more first coherent joint transmission (CJT) physical downlink shared channels (PDSCHs) during one or more second slots after the first slot, wherein the one or more first CJT PDSCHs are obtained based on a first precoding matrix associated with the TCI state.

Another aspect provides a method for wireless communications at a network entity. The method includes obtaining a report comprising a precoding matrix indicator (PMI) for a rank indication (RI); and outputting for transmission, based on the PMI, a coherent joint transmission (CJT) physical downlink shared channel (PDSCH) having a rank, M, less than or equal to the RI.

Still another aspect provides a method for wireless communications at a network entity. The method includes obtaining a report comprising one or more precoding matrix indicators (PMIs), each PMI corresponding to a different rank indication (RI); and outputting for transmission a coherent joint transmission (CJT) physical downlink shared channel (PDSCH) having a rank, M, and based on the PMI corresponding to the RI equal to M.

Yet another aspect provides a method for wireless communications at a network entity. The method includes outputting for transmission a transmission control indicator (TCI) codepoint indicating a TCI state during a first slot; and outputting for transmission one or more coherent joint transmission (CJT) physical downlink shared channels (PDSCHs) during one or more second slots after the first slot, wherein the one or more CJT PDSCHs are output for transmission.

Other aspects provide: an apparatus operable, configured, or otherwise adapted to perform any one or more of the aforementioned methods and/or those described elsewhere herein; a non-transitory, computer-readable media comprising instructions that, when executed by a processor of an apparatus, cause the apparatus to perform the aforementioned methods as well as those described elsewhere herein; a computer program product embodied on a computer-readable storage medium comprising code for performing the aforementioned methods as well as those described elsewhere herein; and/or an apparatus comprising means for performing the aforementioned methods as well as those described elsewhere herein. By way of example, an apparatus may comprise a processing system, a device with a processing system, or processing systems cooperating over one or more networks.

The following description and the appended figures set forth certain features for purposes of illustration.

BRIEF DESCRIPTION OF DRAWINGS

The appended figures depict certain features of the various aspects described herein and are not to be considered limiting of the scope of this disclosure.

FIGS. 8-9 illustrate conceptual examples of precoder matrices.

FIG. 10 illustrates various coherent joint transmission (CJT) and non-coherent joint transmission (NCJT) scenarios.

DETAILED DESCRIPTION

Figure 1:
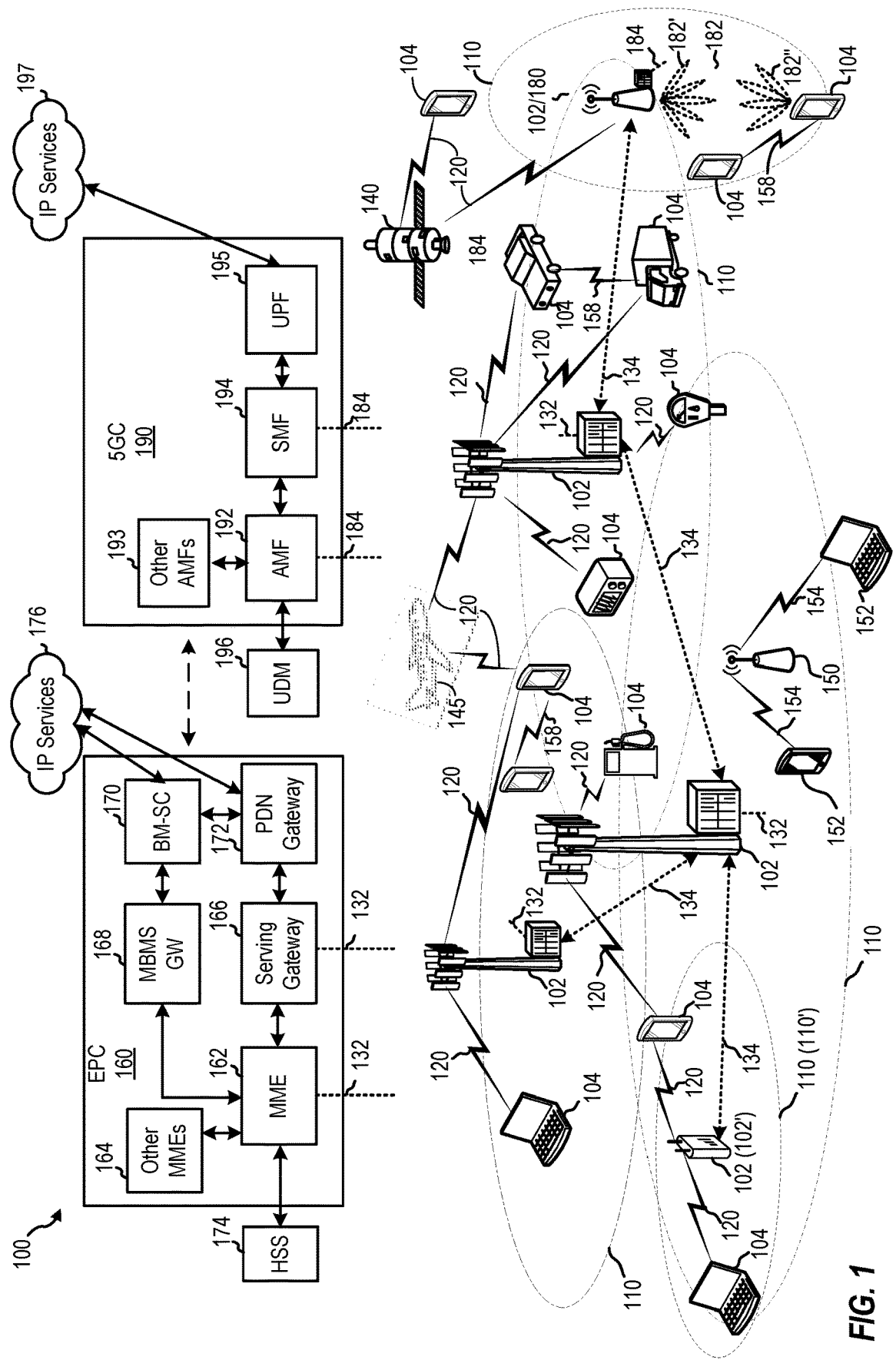
FIG. 1 depicts an example wireless communications network.

Aspects of the present disclosure provide apparatuses, methods, processing systems, and computer-readable mediums for transmitting precoding matrix indicators (PMIs) for rank indications (RIs) and receiving coherent joint transmission (CJT) channels based on the PMIs.

CJT may enable higher data throughput and more reliable signaling to UEs. CJT involves multiple devices each transmitting a beamed transmission to a device. The transmitting devices cooperate so that the receiving device can combine the transmissions into a signal. In systems utilizing transmission and reception points (TRPs), multiple TRPs may each transmit a signal to a UE when using CJT to transmit to the UE.

A unified transmission control indicator (TCI) state framework may be implemented with CJT in a wireless communications system. Using such a framework, a network entity (e.g., a gNB) can indicate a TCI state change(s) to be applied to multiple channels. Such a framework may enable a network to make separate downlink (DL) TCI states applicable to multiple DL channels such as PDCCH, PDSCH, and CSI-RS, and to make separate uplink (UL) TCI states applicable to multiple UL channels and signals such as PUCCH, PUSCH, and SRS. In addition, such a framework may enable joint DL and UL TCI state(s) applicable to multiple DL and UL channels and/or signals. One feature of such a unified TCI state framework is that the indication may be 'sticky.' That is, a UE that receives a unified TCI state ID as described above may be expected to use the indicated TCI for communications until the UE next receives a DCI with a new TCI indication.

A UE may send a report regarding channel conditions to a network entity. The UE may include in the report a precoding matrix indicator (PMI) to indicate to the network entity which precoding matrix (also referred to herein as a precoder) causes the UE to receive a best (e.g., strongest) signal. The report may also include a rank indicator (RI) to indicate to the network entity that the UE can receive a multi-layer transmission having the RI number of layers. When the network entity transmits a signal to the UE, the network may select to use a different precoder than the precoder indicated by the UE, especially if the network entity transmits a signal with fewer layers than the RI. Because the indicated TCI state is 'sticky' when using the unified TCI state framework and applied to many different types of channels, it is desirable for a UE to be able to determine the precoder used by a transmitting network entity for CJT channels.

In aspects of the present disclosure, techniques for a UE to transmit a precoding matrix indicator for a rank indication and to receive one or more coherent joint transmission channels based on the precoding matrix indicator are provided. A UE may also receive a control channel based on the precoding matrix indicator. The UE may determine a precoder based on an order of strengths of layers of a multi-layer transmission and then receive a channel using the precoder. Alternatively or additionally, a control resource set (CORESET) configuration may indicate a precoder to be used by the UE when receiving a channel.

By enabling a UE to determine a precoder to use for receiving coherent joint transmissions, increased data throughput to the UE may be enabled while control channel resources are conserved.

Introduction to Wireless Communications Networks

The techniques and methods described herein may be used for various wireless communications networks. While aspects may be described herein using terminology commonly associated with 3G, 4G, and/or 5G wireless technologies, aspects of the present disclosure may likewise be applicable to other communications systems and standards not explicitly mentioned herein.

FIG. 1 depicts an example of a wireless communications network 100, in which aspects described herein may be implemented.

Generally, wireless communications network 100 includes various network entities (alternatively, network elements or network nodes). A network entity is generally a communications device and/or a communications function performed by a communications device (e.g., a user equipment (UE), a base station (BS), a component of a BS, a server, etc.). For example, various functions of a network as well as various devices associated with and interacting with a network may be considered network entities. Further, wireless communications network 100 includes terrestrial aspects, such as ground-based network entities (e.g., BSs 102), and non-terrestrial aspects, such as satellite 140 and aircraft 145, which may include network entities on-board (e.g., one or more BSs) capable of communicating with other network elements (e.g., terrestrial BSs) and user equipments.

In the depicted example, wireless communications network 100 includes BSs 102, UEs 104, and one or more core networks, such as an Evolved Packet Core (EPC) 160 and 5G Core (5GC) network 190, which interoperate to provide communications services over various communications links, including wired and wireless links.

FIG. 1 depicts various example UEs 104, which may more generally include: a cellular phone, smart phone, session initiation protocol (SIP) phone, laptop, personal digital assistant (PDA), satellite radio, global positioning system, multimedia device, video device, digital audio player, camera, game console, tablet, smart device, wearable device, vehicle, electric meter, gas pump, large or small kitchen appliance, healthcare device, implant, sensor/actuator, display, internet of things (IoT) devices, always on (AON) devices, edge processing devices, or other similar devices. UEs 104 may also be referred to more generally as a mobile device, a wireless device, a wireless communications device, a station, a mobile station, a subscriber station, a mobile subscriber station, a mobile unit, a subscriber unit, a wireless unit, a remote unit, a remote device, an access terminal, a mobile terminal, a wireless terminal, a remote terminal, a handset, and others.

BSs 102 wirelessly communicate with (e.g., transmit signals to or receive signals from) UEs 104 via communications links 120. The communications links 120 between BSs 102 and UEs 104 may include uplink (UL) (also referred to as reverse link) transmissions from a UE 104 to a BS 102 and/or downlink (DL) (also referred to as forward link) transmissions from a BS 102 to a UE 104. The communications links 120 may use multiple-input and multiple-output (MIMO) antenna technology, including spatial multiplexing, beamforming, and/or transmit diversity in various aspects.

BSs 102 may generally include: a NodeB, enhanced NodeB (eNB), next generation enhanced NodeB (ng-eNB), next generation NodeB (gNB or gNodeB), access point, base transceiver station, radio base station, radio transceiver, transceiver function, transmission reception point, and/or others. Each of BSs 102 may provide communications coverage for a respective geographic coverage area 110, which may sometimes be referred to as a cell, and which may overlap in some cases (e.g., small cell 102' may have a coverage area 110' that overlaps the coverage area 110 of a macro cell). A BS may, for example, provide communications coverage for a macro cell (covering relatively large geographic area), a pico cell (covering relatively smaller geographic area, such as a sports stadium), a femto cell (relatively smaller geographic area (e.g., a home)), and/or other types of cells.

Figure 2:
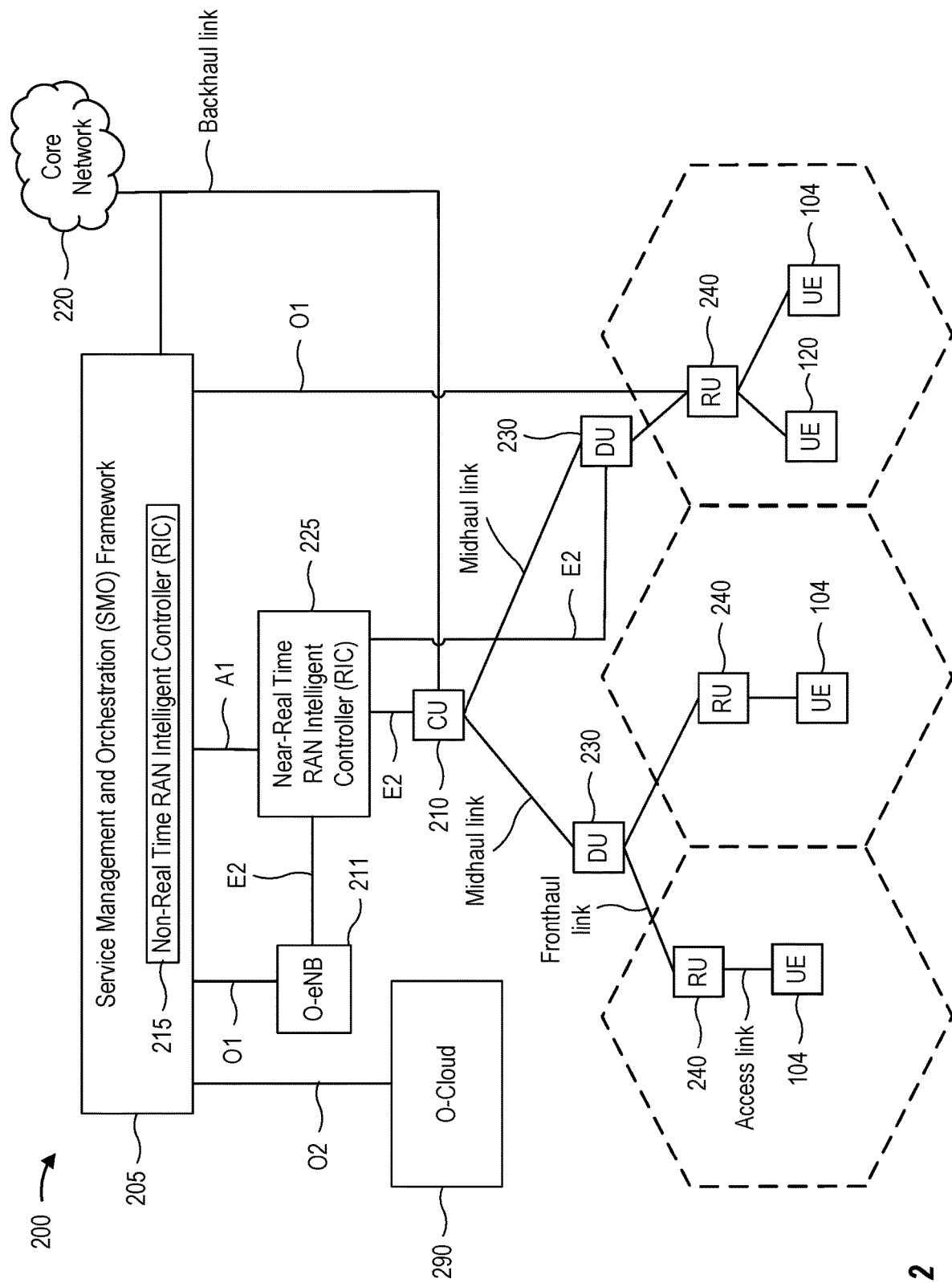
FIG. 2 depicts an example disaggregated base station architecture.

While BSs 102 are depicted in various aspects as unitary communications devices, BSs 102 may be implemented in various configurations. For example, one or more components of a base station may be disaggregated, including a central unit (CU), one or more distributed units (DUs), one or more radio units (RUs), a Near-Real Time (Near-RT) RAN Intelligent Controller (RIC), or a Non-Real Time (Non-RT) RIC, to name a few examples. In another example, various aspects of a base station may be virtualized. More generally, a base station (e.g., BS 102) may include components that are located at a single physical location or components located at various physical locations. In examples in which a base station includes components that are located at various physical locations, the various components may each perform functions such that, collectively, the various components achieve functionality that is similar to a base station that is located at a single physical location. In some aspects, a base station including components that are located at various physical locations may be referred to as a disaggregated radio access network architecture, such as an Open RAN (O-RAN) or Virtualized RAN (VRAN) architecture. FIG. 2 depicts and describes an example disaggregated base station architecture.

Different BSs 102 within wireless communications network 100 may also be configured to support different radio access technologies, such as 3G, 4G, and/or 5G. For example, BSs 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., an S1 interface). BSs 102 configured for 5G (e.g., 5G NR or Next Generation RAN (NG-RAN)) may interface with 5GC 190 through second backhaul links 184. BSs 102 may communicate directly or indirectly (e.g., through the EPC 160 or 5GC 190) with each other over third backhaul links 134 (e.g., X2 interface), which may be wired or wireless.

Wireless communications network 100 may subdivide the electromagnetic spectrum into various classes, bands, channels, or other features. In some aspects, the subdivision is provided based on wavelength and frequency, where frequency may also be referred to as a carrier, a subcarrier, a frequency channel, a tone, or a subband. For example, 3GPP currently defines Frequency Range 1 (FR1) as including 410 MHz-7125 MHz, which is often referred to (interchangeably) as "Sub-6 GHz". Similarly, 3GPP currently defines Frequency Range 2 (FR2) as including 24,250 MHz-52,600 MHZ, which is sometimes referred to (interchangeably) as a "millimeter wave" ("mmW" or "mmWave"). A base station configured to communicate using mmWave/near mmWave radio frequency bands (e.g., a mmWave base station such as BS 180) may utilize beamforming (e.g., 182) with a UE (e.g., 104) to improve path loss and range.

The communications links 120 between BSs 102 and, for example, UEs 104, may be through one or more carriers, which may have different bandwidths (e.g., 5, 10, 15, 20, 100, 400, and/or other MHz), and which may be aggregated in various aspects. Carriers may or may not be adjacent to each other. Allocation of carriers may be asymmetric with respect to DL and UL (e.g., more or fewer carriers may be allocated for DL than for UL).

Communications using higher frequency bands may have higher path loss and a shorter range compared to lower frequency communications. Accordingly, certain base stations (e.g., 180 in FIG. 1) may utilize beamforming 182 with a UE 104 to improve path loss and range. For example, BS 180 and the UE 104 may each include a plurality of antennas, such as antenna elements, antenna panels, and/or antenna arrays to facilitate the beamforming. In some cases, BS 180 may transmit a beamformed signal to UE 104 in one or more transmit directions 182'. UE 104 may receive the beamformed signal from the BS 180 in one or more receive directions 182". UE 104 may also transmit a beamformed signal to the BS 180 in one or more transmit directions 182". BS 180 may also receive the beamformed signal from UE 104 in one or more receive directions 182'. BS 180 and UE 104 may then perform beam training to determine the best receive and transmit directions for each of BS 180 and UE 104. Notably, the transmit and receive directions for BS 180 may or may not be the same. Similarly, the transmit and receive directions for UE 104 may or may not be the same.

Wireless communications network 100 further includes a Wi-Fi AP 150 in communication with Wi-Fi stations (STAs) 152 via communications links 154 in, for example, a 2.4 GHz and/or 5 GHz unlicensed frequency spectrum.

Certain UEs 104 may communicate with each other using device-to-device (D2D) communications link 158. D2D communications link 158 may use one or more sidelink channels, such as a physical sidelink broadcast channel (PSBCH), a physical sidelink discovery channel (PSDCH), a physical sidelink shared channel (PSSCH), a physical sidelink control channel (PSCCH), and/or a physical sidelink feedback channel (PSFCH).

EPC 160 may include various functional components, including: a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and/or a Packet Data Network (PDN) Gateway 172, such as in the depicted example. MME 162 may be in communication with a Home Subscriber Server (HSS) 174. MME 162 is the control node that processes the signaling between the UEs 104 and the EPC 160. Generally, MME 162 provides bearer and connection management.

Generally, user Internet protocol (IP) packets are transferred through Serving Gateway 166, which itself is connected to PDN Gateway 172. PDN Gateway 172 provides UE IP address allocation as well as other functions. PDN Gateway 172 and the BM-SC 170 are connected to IP Services 176, which may include, for example, the Internet, an intranet, an IP Multimedia Subsystem (IMS), a Packet Switched (PS) streaming service, and/or other IP services.

BM-SC 170 may provide functions for MBMS user service provisioning and delivery. BM-SC 170 may serve as an entry point for content provider MBMS transmission, may be used to authorize and initiate MBMS Bearer Services within a public land mobile network (PLMN), and/or may be used to schedule MBMS transmissions. MBMS Gateway 168 may be used to distribute MBMS traffic to the BSs 102 belonging to a Multicast Broadcast Single Frequency Network (MBSFN) area broadcasting a particular service, and/or may be responsible for session management (start/stop) and for collecting eMBMS related charging information.

5GC 190 may include various functional components, including: an Access and Mobility Management Function (AMF) 192, other AMFs 193, a Session Management Function (SMF) 194, and a User Plane Function (UPF) 195. AMF 192 may be in communication with Unified Data Management (UDM) 196.

AMF 192 is a control node that processes signaling between UEs 104 and 5GC 190. AMF 192 provides, for example, quality of service (QOS) flow and session management.

Internet protocol (IP) packets are transferred through UPF 195, which is connected to the IP Services 197, and which provides UE IP address allocation as well as other functions for 5GC 190. IP Services 197 may include, for example, the Internet, an intranet, an IMS, a PS streaming service, and/or other IP services.

In various aspects, a network entity or network node can be implemented as an aggregated base station, as a disaggregated base station, a component of a base station, an integrated access and backhaul (IAB) node, a relay node, a sidelink node, to name a few examples.

FIG. 2 depicts an example disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUS 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communications interfaces of the units, can be configured to communicate with one or more of the other units via the transmission medium. For example, the units can include a wired interface configured to receive or transmit signals over a wired transmission medium to one or more of the other units. Additionally or alternatively, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (e.g., Central Unit-User Plane (CU-UP)), control plane functionality (e.g., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the $3^{rd}$ Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communications with one or more UEs 104. In some implementations, real-time and non-real-time aspects of control and user plane communications with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240, and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance. For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

Figure 3:
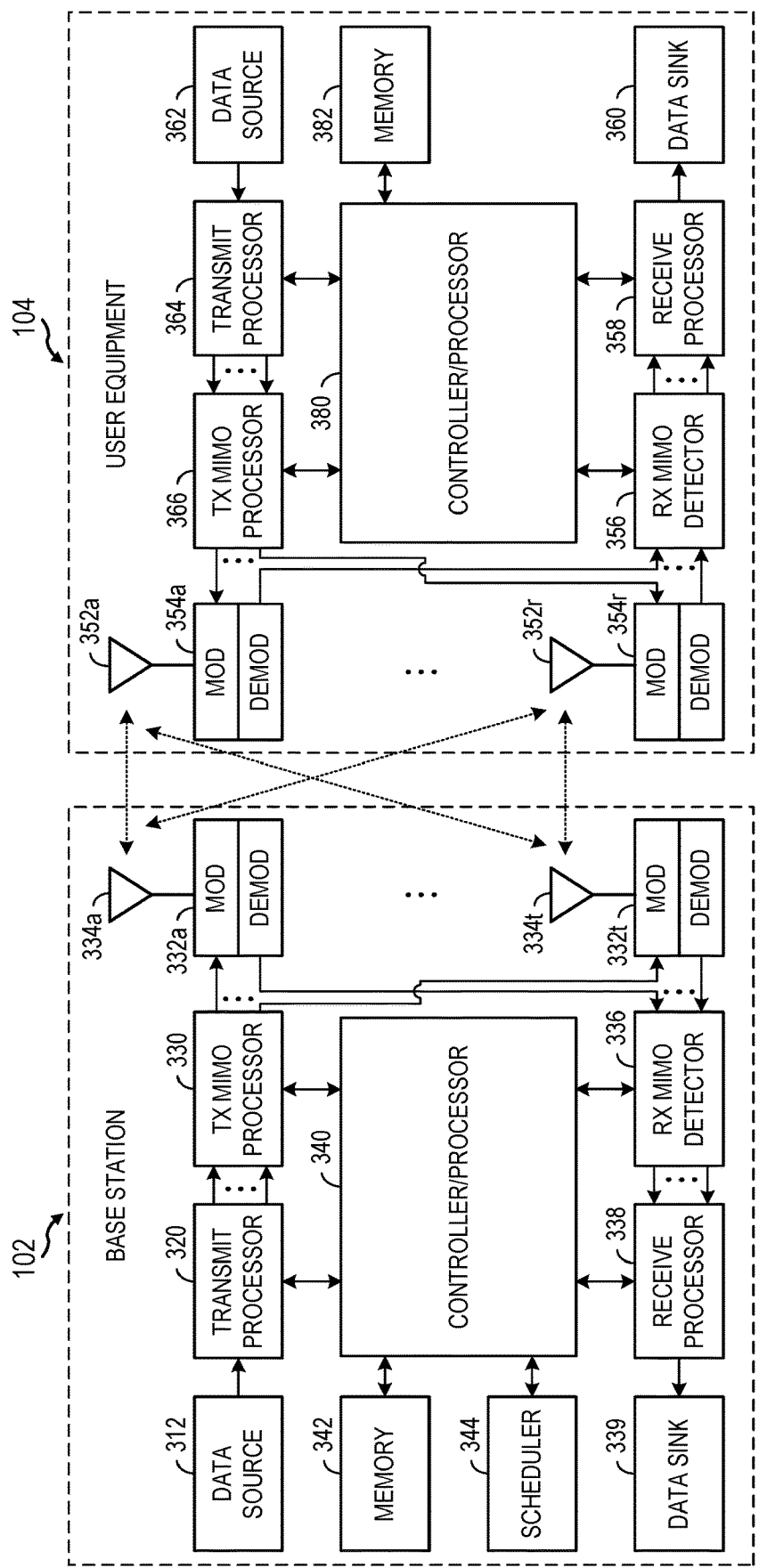
FIG. 3 depicts aspects of an example base station and an example user equipment.

FIG. 3 depicts aspects of an example BS 102 and a UE 104.

Generally, BS 102 includes various processors (e.g., 320, 330, 338, and 340), antennas 334a-t (collectively 334), transceivers 332a-t (collectively 332), which include modulators and demodulators, and other aspects, which enable wireless transmission of data (e.g., data source 312) and wireless reception of data (e.g., data sink 339). For example, BS 102 may send and receive data between BS 102 and UE 104. BS 102 includes controller/processor 340, which may be configured to implement various functions described herein related to wireless communications.

Generally, UE 104 includes various processors (e.g., 358, 364, 366, and 380), antennas 352a-r (collectively 352), transceivers 354a-r (collectively 354), which include modulators and demodulators, and other aspects, which enable wireless transmission of data (e.g., retrieved from data source 362) and wireless reception of data (e.g., provided to data sink 360). UE 104 includes controller/processor 380, which may be configured to implement various functions described herein related to wireless communications.

In regards to an example downlink transmission, BS 102 includes a transmit processor 320 that may receive data from a data source 312 and control information from a controller/processor 340. The control information may be for the physical broadcast channel (PBCH), physical control format indicator channel (PCFICH), physical HARQ indicator channel (PHICH), physical downlink control channel (PDCCH), group common PDCCH (GC PDCCH), and/or others. The data may be for the physical downlink shared channel (PDSCH), in some examples.

Transmit processor 320 may process (e.g., encode and symbol map) the data and control information to obtain data symbols and control symbols, respectively. Transmit processor 320 may also generate reference symbols, such as for the primary synchronization signal (PSS), secondary synchronization signal (SSS), PBCH demodulation reference signal (DMRS), and channel state information reference signal (CSI-RS).

Transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) in transceivers 332a-332t. Each modulator in transceivers 332a-332t may process a respective output symbol stream to obtain an output sample stream. Each modulator may further process (e.g., convert to analog, amplify, filter, and upconvert) the output sample stream to obtain a downlink signal. Downlink signals from the modulators in transceivers 332a-332t may be transmitted via the antennas 334a-334t, respectively.

In order to receive the downlink transmission, UE 104 includes antennas 352a-352r that may receive the downlink signals from the BS 102 and may provide received signals to the demodulators (DEMODs) in transceivers 354a-354r, respectively. Each demodulator in transceivers 354a-354r may condition (e.g., filter, amplify, downconvert, and digitize) a respective received signal to obtain input samples. Each demodulator may further process the input samples to obtain received symbols.

MIMO detector 356 may obtain received symbols from all the demodulators in transceivers 354a-354r, perform MIMO detection on the received symbols if applicable, and provide detected symbols. Receive processor 358 may process (e.g., demodulate, deinterleave, and decode) the detected symbols, provide decoded data for the UE 104 to a data sink 360, and provide decoded control information to a controller/processor 380.

In regards to an example uplink transmission, UE 104 further includes a transmit processor 364 that may receive and process data (e.g., for the PUSCH) from a data source 362 and control information (e.g., for the physical uplink control channel (PUCCH)) from the controller/processor 380. Transmit processor 364 may also generate reference symbols for a reference signal (e.g., for the sounding reference signal (SRS)). The symbols from the transmit processor 364 may be precoded by a TX MIMO processor 366 if applicable, further processed by the modulators in transceivers 354a-354r (e.g., for SC-FDM), and transmitted to BS 102.

At BS 102, the uplink signals from UE 104 may be received by antennas 334a-t, processed by the demodulators in transceivers 332a-332t, detected by a MIMO detector 336 if applicable, and further processed by a receive processor 338 to obtain decoded data and control information sent by UE 104. Receive processor 338 may provide the decoded data to a data sink 339 and the decoded control information to the controller/processor 340.

Memories 342 and 382 may store data and program codes for BS 102 and UE 104, respectively.

Scheduler 344 may schedule UEs for data transmission on the downlink and/or uplink.

In various aspects, BS 102 may be described as transmitting and receiving various types of data associated with the methods described herein. In these contexts, "transmitting" may refer to various mechanisms of outputting data, such as outputting data from data source 312, scheduler 344, memory 342, transmit processor 320, controller/processor 340, TX MIMO processor 330, transceivers 332a-t, antenna 334a-t, and/or other aspects described herein. Similarly, "receiving" may refer to various mechanisms of obtaining data, such as obtaining data from antennas 334a-t, transceivers 332a-t, RX MIMO detector 336, controller/processor 340, receive processor 338, scheduler 344, memory 342, and/or other aspects described herein.

In various aspects, UE 104 may likewise be described as transmitting and receiving various types of data associated with the methods described herein. In these contexts, "transmitting" may refer to various mechanisms of outputting data, such as outputting data from data source 362, memory 382, transmit processor 364, controller/processor 380, TX MIMO processor 366, transceivers 354a-t, antenna 352a-t, and/or other aspects described herein. Similarly, "receiving" may refer to various mechanisms of obtaining data, such as obtaining data from antennas 352a-t, transceivers 354a-t, RX MIMO detector 356, controller/processor 380, receive processor 358, memory 382, and/or other aspects described herein.

In some aspects, a processor may be configured to perform various operations, such as those associated with the methods described herein, and transmit (output) to or receive (obtain) data from another interface that is configured to transmit or receive, respectively, the data.

FIGS. 4A, 4B, 4C, and 4D depict aspects of data structures for a wireless communications network, such as wireless communications network 100 of FIG. 1.

Figure 4:
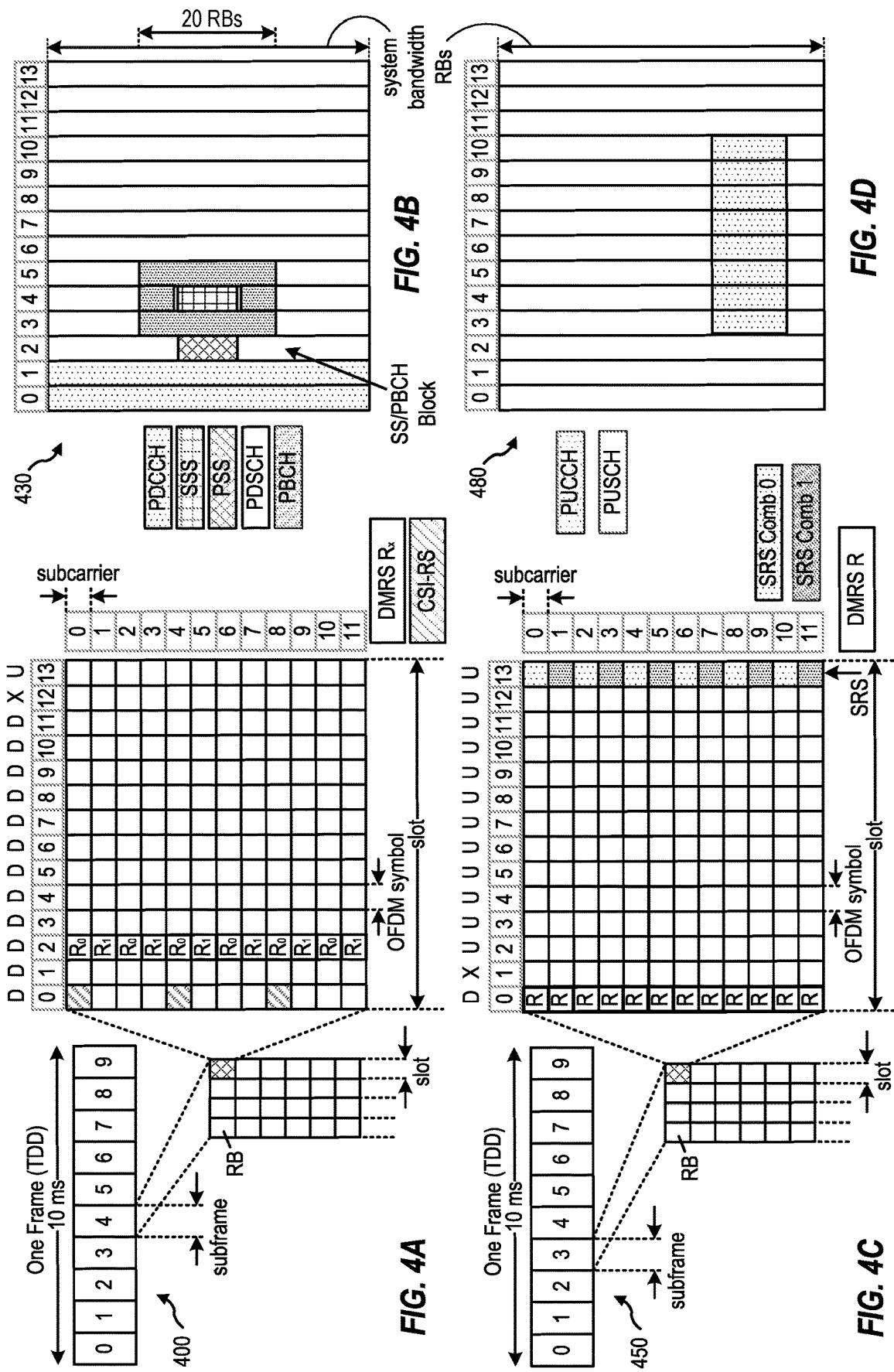
FIGS. 4A, 4B, 4C, and 4D depict various example aspects of data structures for a wireless communications network.

In particular, FIG. 4A is a diagram 400 illustrating an example of a first subframe within a 5G (e.g., 5G NR) frame structure, FIG. 4B is a diagram 430 illustrating an example of DL channels within a 5G subframe, FIG. 4C is a diagram 450 illustrating an example of a second subframe within a 5G frame structure, and FIG. 4D is a diagram 480 illustrating an example of UL channels within a 5G subframe.

Wireless communications systems may utilize orthogonal frequency division multiplexing (OFDM) with a cyclic prefix (CP) on the uplink and downlink. Such systems may also support half-duplex operation using time division duplexing (TDD). OFDM and single-carrier frequency division multiplexing (SC-FDM) partition the system bandwidth (e.g., as depicted in FIGS. 4B and 4D) into multiple orthogonal subcarriers. Each subcarrier may be modulated with data. Modulation symbols may be sent in the frequency domain with OFDM and/or in the time domain with SC-FDM.

A wireless communications frame structure may be frequency division duplex (FDD), in which, for a particular set of subcarriers, subframes within the set of subcarriers are dedicated for either DL or UL. Wireless communications frame structures may also be time division duplex (TDD), in which, for a particular set of subcarriers, subframes within the set of subcarriers are dedicated for both DL and UL.

In FIGS. 4A and 4C, the wireless communications frame structure is TDD where D is DL, U is UL, and X is flexible for use between DL/UL. UEs may be configured with a slot format through a received slot format indicator (SFI) (dynamically through DL control information (DCI), or semi-statically/statically through radio resource control (RRC) signaling). In the depicted examples, a 10 ms frame is divided into 10 equally sized 1 ms subframes. Each subframe may include one or more time slots. In some examples, each slot may include 7 or 14 symbols, depending on the slot format. Subframes may also include mini-slots, which generally have fewer symbols than an entire slot. Other wireless communications technologies may have a different frame structure and/or different channels.

In certain aspects, the number of slots within a subframe is based on a slot configuration and a numerology. For example, for slot configuration 0, different numerologies (μ) 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology u, there are 14 symbols/slot and $2\mu$ slots/subframe. The subcarrier spacing and symbol length/duration are a function of the numerology. The subcarrier spacing may be equal to $2^{\mu} \times 15$ kHz, where u is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 4A, 4B, 4C, and 4D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs.

As depicted in FIGS. 4A, 4B, 4C, and 4D, a resource grid may be used to represent the frame structure. Each time slot includes a resource block (RB) (also referred to as physical RBs (PRBs)) that extends, for example, 12 consecutive subcarriers. The resource grid is divided into multiple resource elements (REs). The number of bits carried by each RE depends on the modulation scheme.

As illustrated in FIG. 4A, some of the REs carry reference (pilot) signals (RS) for a UE (e.g., UE 104 of FIGS. 1 and 3). The RS may include demodulation RS (DMRS) and/or channel state information reference signals (CSI-RS) for channel estimation at the UE. The RS may also include beam measurement RS (BRS), beam refinement RS (BRRS), and/or phase tracking RS (PT-RS).

FIG. 4B illustrates an example of various DL channels within a subframe of a frame. The physical downlink control channel (PDCCH) carries DCI within one or more control channel elements (CCEs), each CCE including, for example, nine RE groups (REGs), each REG including, for example, four consecutive REs in an OFDM symbol.

A primary synchronization signal (PSS) may be within symbol 2 of particular subframes of a frame. The PSS is used by a UE (e.g., 104 of FIGS. 1 and 3) to determine subframe/symbol timing and a physical layer identity.

A secondary synchronization signal (SSS) may be within symbol 4 of particular subframes of a frame. The SSS is used by a UE to determine a physical layer cell identity group number and radio frame timing.

Based on the physical layer identity and the physical layer cell identity group number, the UE can determine a physical cell identifier (PCI). Based on the PCI, the UE can determine the locations of the aforementioned DMRS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and/or paging messages.

As illustrated in FIG. 4C, some of the REs carry DMRS (indicated as R for one particular configuration, but other DMRS configurations are possible) for channel estimation at the base station. The UE may transmit DMRS for the PUCCH and DMRS for the PUSCH. The PUSCH DMRS may be transmitted, for example, in the first one or two symbols of the PUSCH. The PUCCH DMRS may be transmitted in different configurations depending on whether short or long PUCCHs are transmitted and depending on the particular PUCCH format used. UE 104 may transmit sounding reference signals (SRS). The SRS may be transmitted, for example, in the last symbol of a subframe. The SRS may have a comb structure, and a UE may transmit SRS on one of the combs. The SRS may be used by a base station for channel quality estimation to enable frequency-dependent scheduling on the UL.

FIG. 4D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Example CSI Report Configuration

Channel state information (CSI) may refer to channel properties of a communication link. The CSI may represent the combined effects of, for example, scattering, fading, and power decay with distance between a transmitter and a receiver. Channel estimation using pilots, such as CSI reference signals (CSI-RS), may be performed to determine these effects on the channel. CSI may be used to adapt transmissions based on the current channel conditions, which is useful for achieving reliable communication, in particular, with high data rates in multi-antenna systems. CSI is typically measured at the receiver, quantized, and fed back to the transmitter.

The time and frequency resources that can be used by a user equipment (UE) to report CSI are controlled by a base station (BS) (e.g., gNB). CSI may include channel quality indicator (CQI), precoding matrix indicator (PMI), CSI-RS resource indicator (CRI), SS/PBCH Block Resource indicator (SSBRI), layer indicator (LI), rank indicator (RI), and/or L1-RSRP. However, as described below, additional or other information may be included in the report.

A UE may be configured by a BS for CSI reporting. The BS may configure UEs for the CSI reporting. For example, the BS configures the UE with a CSI report configuration or with multiple CSI report configurations. The CSI report configuration may be provided to the UE via higher layer signaling, such as radio resource control (RRC) signaling (e.g., CSI-ReportConfig). The CSI report configuration may be associated with CSI-RS resources for channel measurement (CM), interference measurement (IM), or both. The CSI report configuration configures CSI-RS resources for measurement (e.g., CSI-ResourceConfig). The CSI-RS resources provide the UE with the configuration of CSI-RS ports, or CSI-RS port groups, mapped to time and frequency resources (e.g., resource elements (REs)). CSI-RS resources can be zero power (ZP) or non-zero power (NZP) resources. At least one NZP CSI-RS resource may be configured for CM.

For the Type II codebook, the PMI is a linear combination of beams; it has a subset of orthogonal beams to be used for linear combination and has per layer, per polarization, amplitude and phase for each beam. For the PMI of any type, there can be wideband (WB) PMI and/or subband (SB) PMI as configured.

The CSI report configuration may configure the UE for aperiodic, periodic, or semi-persistent CSI reporting. For periodic CSI, the UE may be configured with periodic CSI-RS resources. Periodic CSI on physical uplink control channel (PUCCH) may be triggered via RRC. Semi-persistent CSI reporting on physical uplink control channel (PUCCH) may be activated via a medium access control (MAC) control element (CE). For aperiodic and semi-persistent CSI on the physical uplink shared channel (PUSCH), the BS may signal the UE a CSI report trigger indicating for the UE to send a CSI report for one or more CSI-RS resources, or configuring the CSI-RS report trigger state (e.g., CSI-AperiodicTriggerStateList and CSI-SemiPersistentOnPUSCH-TriggerStateList). The CSI report trigger for aperiodic CSI and semi-persistent CSI on PUSCH may be provided via downlink control information (DCI).

The UE may report the CSI feedback (CSF) based on the CSI report configuration and the CSI report trigger. For example, the UE may measure the channel on which the triggered CSI-RS resources (associated with the CSI report configuration) is conveyed. Based on the measurements, the UE may select a preferred CSI-RS resource. The UE reports the CSF for the selected CSI-RS resource. LI may be calculated conditioned on the reported CQI, PMI, RI and CRI; CQI may be calculated conditioned on the reported PMI, RI and CRI; PMI may be calculated conditioned on the reported RI and CRI; and RI may be calculated conditioned on the reported CRI.

Each CSI report configuration may be associated with a single downlink (DL) bandwidth part (BWP). The CSI report setting configuration may define a CSI reporting band as a subset of subbands of the BWP. The associated DL BWP may indicated by a higher layer parameter (e.g., bwp-Id) in the CSI report configuration for channel measurement and contains parameter(s) for one CSI reporting band, such as codebook configuration, time-domain behavior, frequency granularity for CSI, measurement restriction configurations, and the CSI-related quantities to be reported by the UE. Each CSI resource setting may be located in the DL BWP identified by the higher layer parameter, and all CSI resource settings may be linked to a CSI report setting have the same DL BWP.

In certain systems, the UE can be configured via higher layer signaling (e.g., in the CSI report configuration) with one out of two possible subband sizes (e.g., reportFreqConfiguration contained in a CSI-ReportConfig) which indicates a frequency granularity of the CSI report, where a subband may be defined as $N_{PRB}^{SB}$ contiguous physical resource blocks (PRBs) and depends on the total number of PRBs in the bandwidth part. The UE may further receive an indication of the subbands for which the CSI feedback is requested. In some examples, a subband mask is configured for the requested subbands for CSI reporting. The UE computes precoders for each requested subband and finds the PMI that matches the computed precoder on each of the subbands.

Compressed CSI Feedback Coefficient Reporting

As discussed above, a user equipment (UE) may be configured for channel state information (CSI) reporting, for example, by receiving a CSI configuration message from the base station. In certain systems (e.g., 3GPP Release 15 5G NR), the UE may be configured to report at least a Type II precoder across configured frequency domain (FD) units. For example, the precoder matrix $W_r$ for layer r includes the $W_1$ matrix, reporting a subset of selected beams using spatial compression and the $W_{2,r}$ matrix, reporting (for cross-polarization) the linear combination coefficients for the selected beams (2L) across the configured FD units:

$$W_r = \sum_{i=0}^{2L-1} b_i \cdot c_i, \text{ where } c_i = [\underbrace{c_{i,0} \ldots c_{i,N_3-1}}_{N_3}],$$

where $b_i$ is the selected beam, $c_i$ is the set of linear combination coefficients (i.e., entries of $W_{2,r}$ matrix), L is the number of selected spatial beams, and $N_3$ corresponds to the number of frequency units (e.g., subbands, resource blocks (RBs), etc.). In certain configurations, L is RRC configured. The precoder is based on a linear combination of digital Fourier transform (DFT) beams. The Type II codebook may improve MU-MIMO performance. In some configurations considering there are two polarizations, the $W_{2,r}$ matrix has size $2L \times N_3$.

Figure 5:
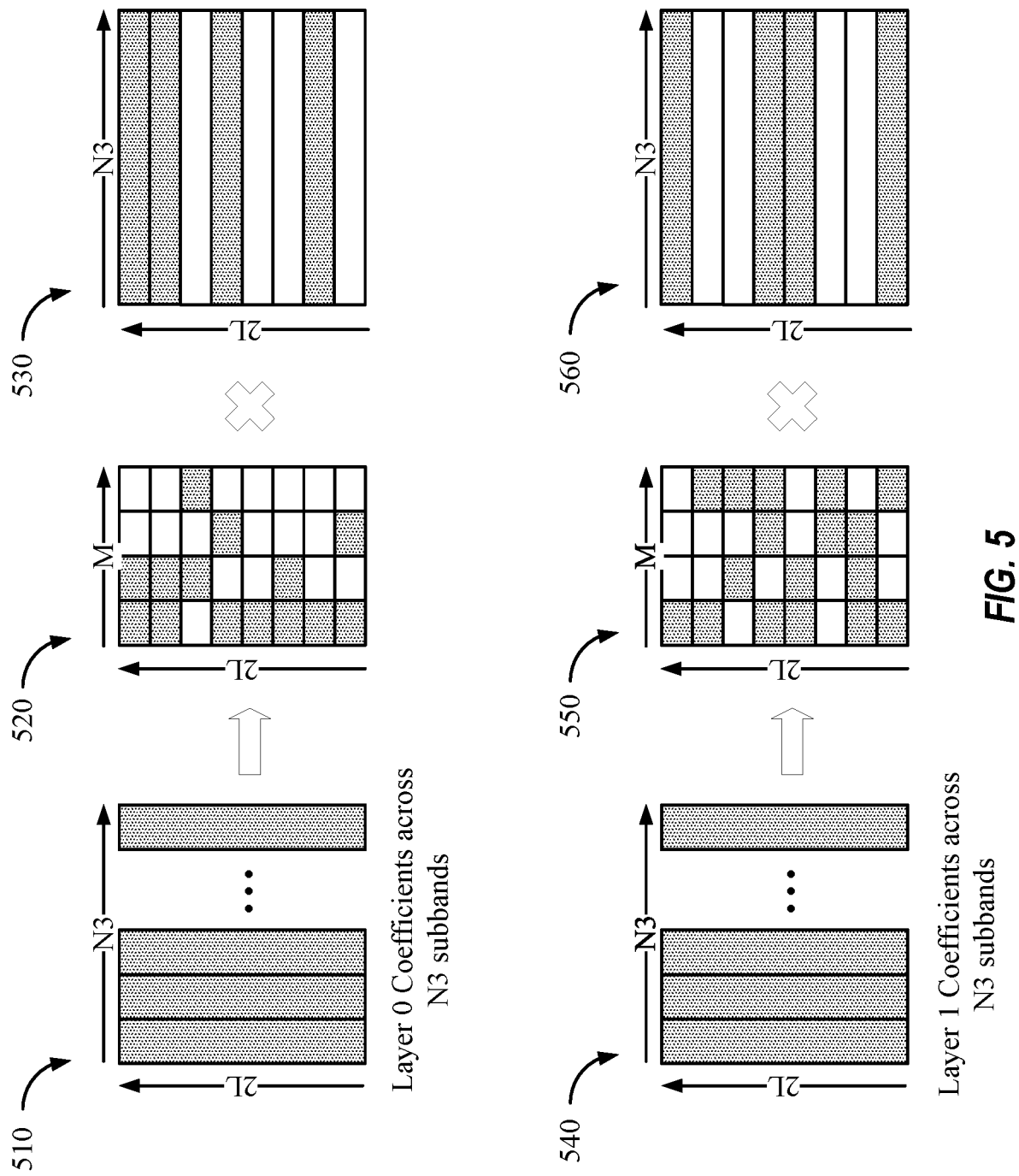
FIG. 5 illustrates a conceptual example of precoder matrices.

In certain systems (e.g., Rel-16 5G NR), the UE may be configured to report FD compressed precoder feedback to reduce overhead of the CSI report. As shown in FIG. 5, the precoder matrix ($W_{2,i}$) for layer i with i=0, 1 may use an FD compression $W_{f,i}^H$ matrix to compress the precoder matrix into $\tilde{W}_{2,i}$ matrix size to $2L \times M$ (where M is network configured and communicated in the CSI configuration message via RRC or DCI, and M<$N_3$) given as:

$$W_i = W_1 \tilde{W}_{2,i} W_{f,i}^H$$

Where the precoder matrix $W_i$ (not shown) has $P=2N_1N_2$ rows (spatial domain, number of ports) and $N_3$ columns (frequency-domain compression unit containing RBs or reporting sub-bands), and where M bases are selected for each of layer 0 and layer 1 independently. The $\tilde{W}_{2,0}$ matrix 520 consists of the linear combination coefficients (amplitude and co-phasing), where each element represents the coefficient of a tap for a beam. The $\tilde{W}_{2,0}$ matrix 520 as shown is defined by size $2L \times M$, where one row corresponds to one spatial beam in $W_1$ (not shown) of size $P \times 2L$ (where L is network configured via RRC), and one entry therein represents the coefficient of one tap for this spatial beam. The UE may be configured to report (e.g., CSI report) a subset $K_0 < 2LM$ of the linear combination coefficients of the $\tilde{W}_{2,0}$ matrix 520. For example, the UE may report $K_{NZ,i} \leq K_0$ coefficients (where $K_{NZ,i}$ corresponds to a maximum number of non-zero coefficients for layer-i with i=0 or 1, and $K_0$ is network configured via RRC) illustrated as shaded squares (unreported coefficients are set to zero). In some configurations, an entry in the $\tilde{W}_{2,0}$ matrix 520 corresponds to a row of Who matrix 530. In the example shown, both the $\tilde{W}_{2,0}$ matrix 520 at layer 0 and the $\tilde{W}_{2,0}$ matrix 450 at layer 1 are $2L \times M$.

The $W_{f,0}^H$ matrix 530 is composed of the basis vectors (each row is a basis vector) used to perform compression in frequency domain. In the example shown, both the $W_{f,0}^H$ matrix 530 at layer 0 and the $W_{f,1}^H$ matrix 560 at layer 1 include M=4 FD basis (illustrated as shaded rows) from $N_3$ candidate DFT basis. In some configurations, the UE may report a subset of selected basis of the $W_{f,i}^H$ matrix via CSI report. The M bases specifically selected at layer 0 and layer 1. That is, the M bases selected at layer 0 can be same/partially-overlapped/non-overlapped with the M bases selected at layer 1.

Overview of UE PMI Codebook-Based CSF

A PMI codebook generally refers to a dictionary of PMI entries. In this way, using a PMI codebook, each PMI component from a pre-defined set can be mapped to bit-sequences reported by a UE. A base station receiving the bit-sequence (as CSF) can then obtain the corresponding PMI from the reported bit-sequence.

How the UE calculates PMI may be left to UE implementation. However, how the UE reports the PMI should follow a format defined in the codebook, so the UE and base station each know how to map PMI components to reported bit-sequences.

Figure 6:
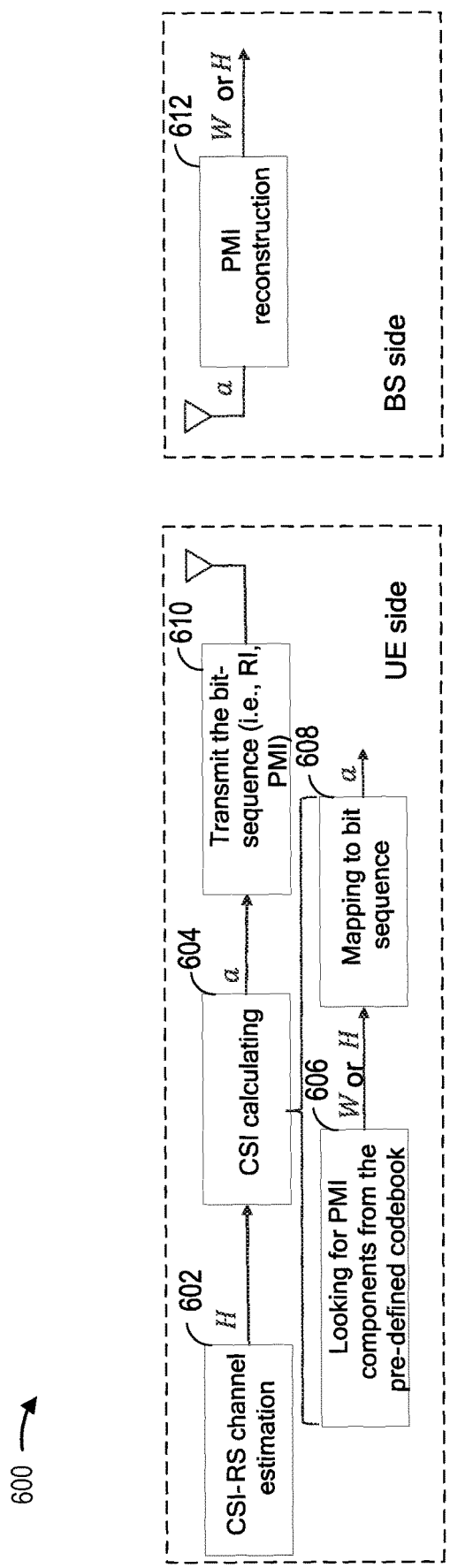
FIG. 6 is a block diagram illustrating an example of codebook based CSF.

FIG. 6 is a block diagram illustrating an example of codebook based CSF. As illustrated, the UE may first perform channel estimation (at 602) based on CSI-RS to estimate channel H. A CSI calculating block 604 may generate a bit sequence a. As illustrated, bit sequence a may be generated looking for PMI components from the pre-defined PMI codebook for radio channel H or precoder W (at block 606) and mapping the PMI components to the bit sequence a, via block 608. This mapping, from a set of predefined PMI components essentially acts as a form of quantization. The UE transmits the bit sequence a to the BS (e.g., in a CSI report), via block 610.

As illustrated in FIG. 6, at the BS side, the BS receives the bit sequence a reported by the UE. The BS then follows the codebook to obtain each PMI component using the reported bit-sequence a and reconstructs the actual PMI, at block 612, using each PMI component (obtained from the codebook), to recover the radio channel H or precoder W.

Figure 7:
FIG. 7 illustrates example transmitter receiver point (TRP) scenarios.

FIG. 7 shows various scenarios for CJT. The scenarios are referred to as Scenario 1A, where co-located TRPs/panels (intra-site) have the same orientation and Scenario 1B, where the panels have different orientations (inter-sector). Another scenario, Scenario 2, may involve Distributed TRPs (inter-site).

Figure 8:
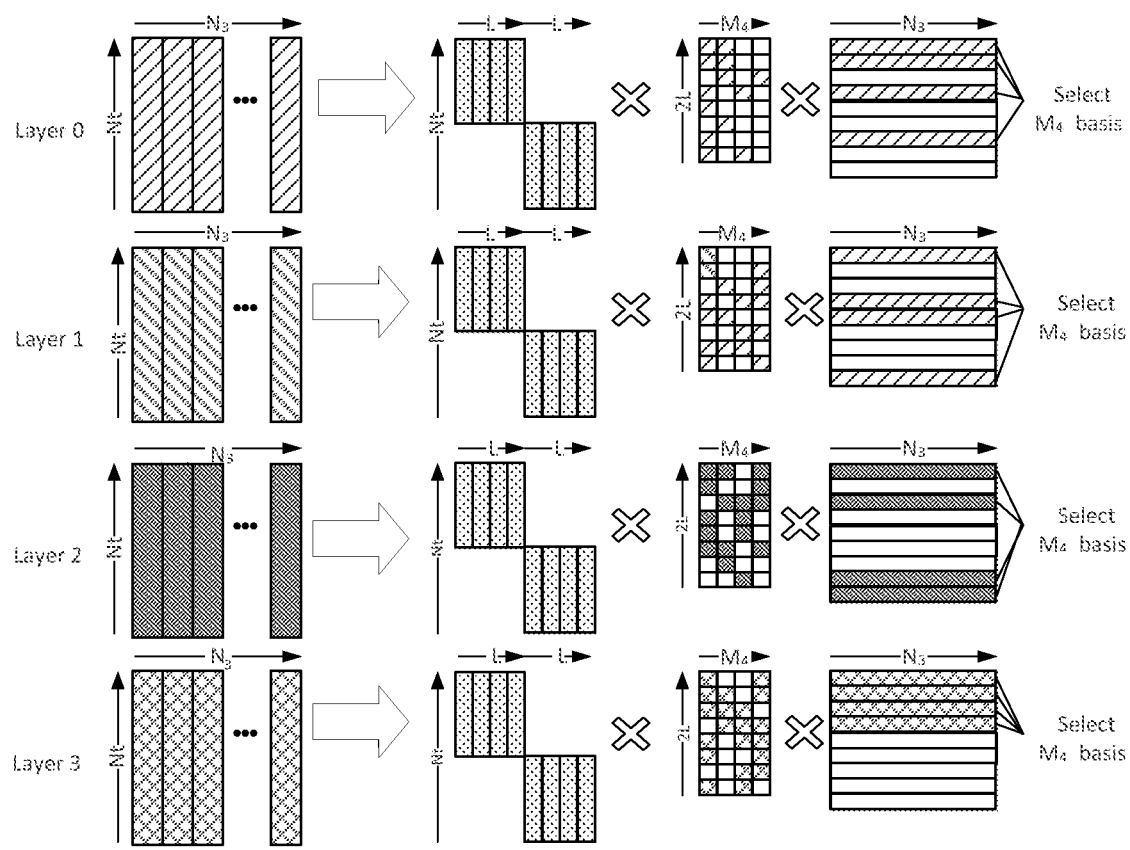

FIG. 8 shows an example for enhanced Type-II (eType-II) CSI where, for each layer, the precoder across a number of $N_3$ (PMI-)subbands is a $N_t \times N_3$ matrix:

$$W: W = W_1 \times \tilde{W}_2 \times W_f^H.$$

where SD bases $W_1$ (DFT bases) is a $N_t \times 2L$ matrix, $W_1$ is layer-common, $N_t = 2N_1O_1N_2O_2$ (number of Tx antennas— with $O_1$ and $O_2$ oversampling) is RRC-configured, L={2, 4, 6} (number of beams) is RRC-configured FD bases $W_f$ (DFT bases) is a M×$N_3$ matrix, $W_f$ is layer-specific, M (number of FD bases) is rank-pair specific, i.e. $M_1=M_2$ for rank={1, 2}, and $M_3=M_4$ for rank={3, 4}, $M_1$ or $M_3$ is RRC-configured. Coefficients matrix $\tilde{W}_2$ is a 2L×M matrix and is layer-specific. For each layer, a UE may report up to $K_0$ non-zero coefficients, where $K_0$ is RRC-configured. Across all layers, the UE may report up to $2K_0$ non-zero coefficients, where unreported coefficients may be set to zeros.

FIG. 9 shows example scenarios for spatial division multiplexed (SDM-based) NCJT, in which data is precoded separately on different TRPs. FIG. 9 also shows an example of CJT, in which data is precoded in a fully-joint way. According to one option, data may be precoded with separate precoder with co-phase and amplitude coefficients. It is also possible that the co-phase/-amplitude is implicitly accommodated into the precoder (thus the equation can appear with no difference from NCJT case). Port diagrams for the NCJT, first option of CJT and second option of CJT, are also illustrated in FIG. 10.

Aspects Related to Strongest Coefficient Indication

Calculating a precoder for use in CJT involves matrix-multiplying an SD basis matrix by a matrix of coefficients and an FD basis matrix. For a type-II codebook, the matrix of coefficients may be signaled to a network entity (e.g., a BS or a TRP) by a UE.

Figure 11:
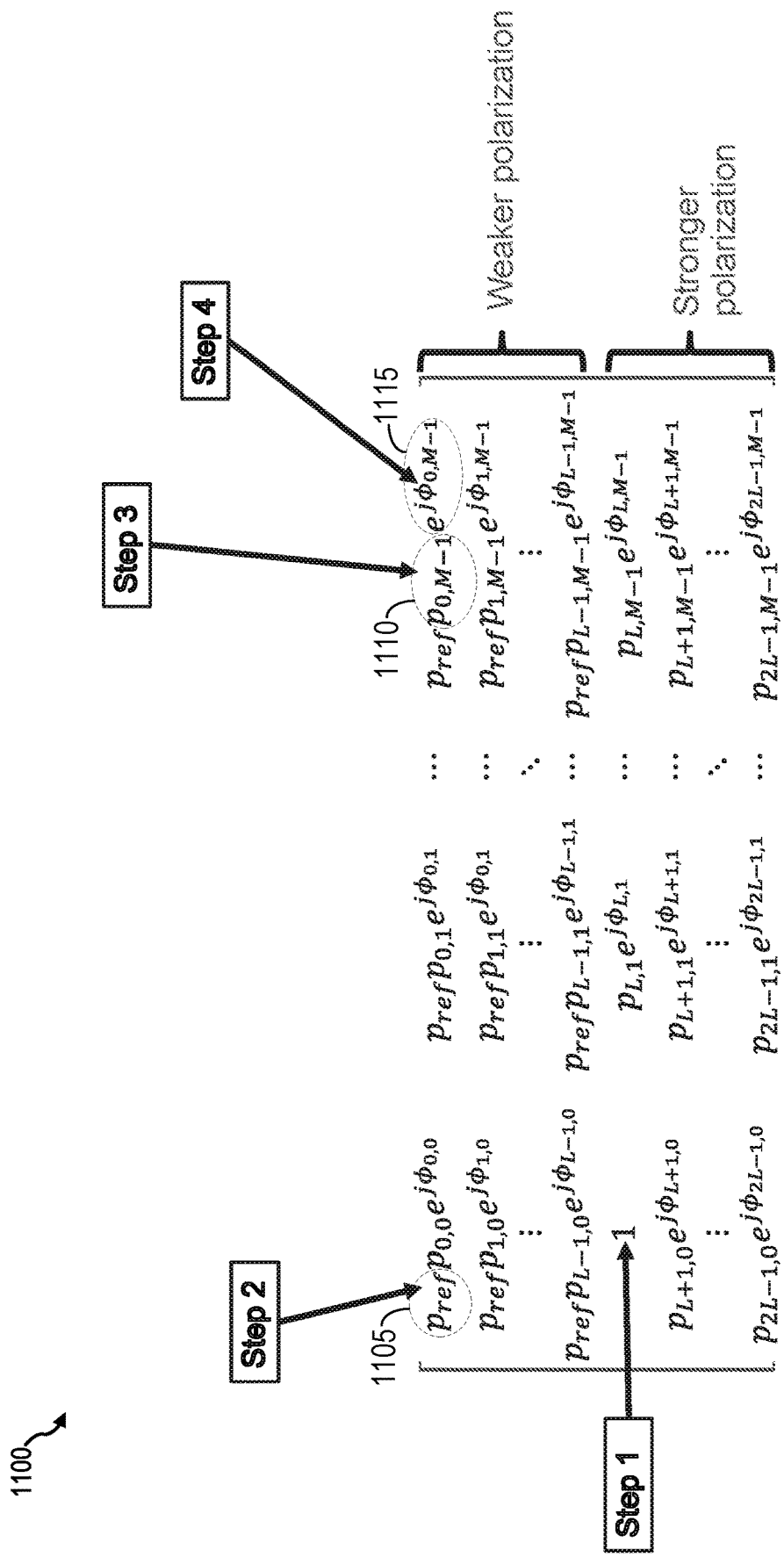
FIG. 11 illustrates a technique for performing strongest coefficient indication (SCI) based differential quantization, according to aspects of the present disclosure.

Strongest coefficient indication (SCI) based differential quantization is a technique for a UE to signal a matrix of coefficients. FIG. 11 illustrates a technique for performing SCI, according to aspects of the present disclosure. The illustrated matrix 1100 is an example matrix of coefficients, $\tilde{W}_2$, with each coefficient the product of a reference power $p_{ref}$ (shown at 1105), a differential amplitude $p_{0,0}$ (shown at 1110), and a phase, $e^{j\phi_{0,0}}$, etc. (shown at 1115). In a first step of SCI-based differential quantization, a UE determines which coefficient in the matrix is the strongest coefficient. The index of that coefficient is reported by the UE, but that coefficient is not quantized, as it is set to 1 and used a reference for the stronger polarization. In a second step, a reference power for the weaker polarization, $p_{ref}$, is determined and quantized with four bits, with values ranging from 0 dB to −24 dB in −1.5 dB steps. In a third step, differential amplitudes for the coefficients are determined and quantized with three bits, with values ranging from 0 dB to −24 dB in −3 dB steps. In a fourth step, the phases of each of the coefficients are quantized using a 16 phase-shift keying (16PSK) alphabet. After quantizing each of the non-zero coefficients (NZCs) of $\tilde{W}_2$, the UE transmits the quantized values to a network entity for the network entity to use when making a coherent joint transmission to the UE.

Aspects Related to a Unified Transmission Control Indicator Framework

A unified TCI state framework is expected to be a part of future wireless communications systems. Using such a framework, a network entity (e.g., a gNB) can indicate a TCI state change(s) to be applied to multiple channels. Such a framework may enable a network to make separate DL TCI states applicable to multiple DL channels such as PDCCH, PDSCH, and CSI-RS, as well as separate UL TCI states applicable to multiple UL channels and signals such as PUCCH, PUSCH, and SRS. In addition, such a framework may enable joint DL and UL TCI state(s) applicable to multiple DL and UL channels and/or signals.

In such a framework, a unified TCI state ID may be signaled to a UE by a network entity (e.g., a gNB) using DCI formats 1_1 and/or 1_2 with or without the DCI including a DL assignment for the UE.

One feature of such a unified TCI state framework is that the indication may be 'sticky.' That is, a UE that receives a unified TCI state ID as described above is expected to use the indicated TCI for communications until the UE next receives a DCI with a new TCI indication.

In addition, not only may the indication be sticky, but the indication may also apply to multiple different channels in a unified manner, depending on the type of the TCI state indicated to a UE.

Further signaling aspects and rules related to a unified TCI framework and extending the unified TCI framework to multiple TRP (mTRP) transmissions are desirable.

To use a unified TCI framework for single DCI (S-DCI) based mTRP transmissions, it is desirable to inform a UE of the association of the joint and/or DL TCI state(s) indicated by a DCI and/or a MAC-CE for PDCCH repetition, SFN-based PDCCH, and PDCCH transmission without repetition and not SFN-based, a network (e.g., a network entity, such as a gNB) may select one or more of the following alternatives: 1-1: the network may use RRC parameter(s) in a CORESET configuration to inform the UE whether and/or which indicated joint and/or DL TCI state(s) shall be applied to the corresponding PDCCH receptions on the CORESET; 1-2: the network may use an RRC parameter in a CORESET configuration to indicate that the CORESET belongs to a CORESET group(s), and the indicated joint and/or DL TCI state(s) may be associated with one or more CORESET group(s); 2: an association between a CORESET and the indicated joint and/or DL TCI state(s) may be determined (e.g., by the UE and by the network) based on a rule, and the UE may apply the indicated joint and/or DL TCI state(s) to corresponding PDCCH receptions on the CORESET; or 3: the network may use a MAC-CE to inform a UE whether and/or which indicated joint and/or DL TCI state(s) to apply to corresponding PDCCH receptions on a CORESET.

According to aspects of the present disclosure, a network may switch between multi-TRP and single TRP operation while using a unified TCI framework as described herein.

In aspects of the present disclosure, future (e.g., Rel-18) Type-II codebooks may support CJT mTRP with $N_{TRP}$>1 TRPs or TRP-groups, with $N_{TRP}$ being one of {1, 2, 3, 4}.

In aspects of the present disclosure, future (e.g., Rel-18) Type-II codebooks may support CJT mTRP with a rank indication (RI) being one of {1, 2, 3, 4}.

According to aspects of the present disclosure, a communication system using a Type-II codebook for CJT mTRP may determine the number of cooperating TRPs assumed in PMI reporting, N, by configuring N in higher-layer (e.g., RRC) signaling from a network entity (e.g., a gNB). In such a case, the N configured TRPs may also be configured by the network via higher-layer (e.g., RRC) signaling. Also, in such a case, only one transmission hypothesis may be reported.

According to aspects of the present disclosure, a communication system using a Type-II codebook for CJT mTRP may determine the number of cooperating TRPs assumed in PMI reporting, N, by a UE selecting and reporting N as part of a CSI report, where N∈{1, . . . , $N_{TRP}$}. In such a case, N is the number of cooperating TRPs, while $N_{TRP}$ is the maximum number of cooperating TRPs configured by the network (e.g., a network entity, such as a gNB). Also in such a case, the selection of N out of $N_{TRP}$ TRPs may also be reported. Also in such a case, only one transmission hypothesis may be reported. A UE is typically not mandated to calculate CSI for multiple transmission hypotheses.

In aspects of the present disclosure, up to 4 TRPs may be involved in coherent joint transmission, which may be utilize a unified TCI framework as described herein.

According to aspects of the present disclosure, in CJT, multiple TCI states may be associated with a same antenna port. When multiple DL TCI states are mapped to a codepoint as part of a unified TCI state framework, it is desirable for a UE to know whether the same precoding is applicable to multiple different channels.

In aspects of the present disclosure, a network entity (e.g., a gNB) may fix a transmit analog beam (e.g., for TCI states) and the (digital) precoding weights for transmission of various layers in a 'sticky' manner, as a change of transmission settings (e.g., change of beam or precoding weight) may disrupt phase continuity of transmissions across time and across TRPs, which is disruptive to CJT, as CJT depends on phase continuity. However, the precoding needed for different channels may be different. For example, a PDCCH is a single-port channel, while the rank of PDSCHs may change dynamically, and so the same precoding may not be applicable to both PDCCH and PDSCH.

Therefore, techniques for specifying precoding weights for mTRP transmission when applied in a unified TCI framework to enable smooth and robust operation are desired.

Aspects Related to Unified Precoding and Channel State Indication Enhancement

In aspects of the present disclosure, techniques for transmitting precoding matrix indicators (PMIs) for rank indications (RIs) and receiving coherent joint transmission (CJT) channels based on the PMIs are provided.

Figure 12:
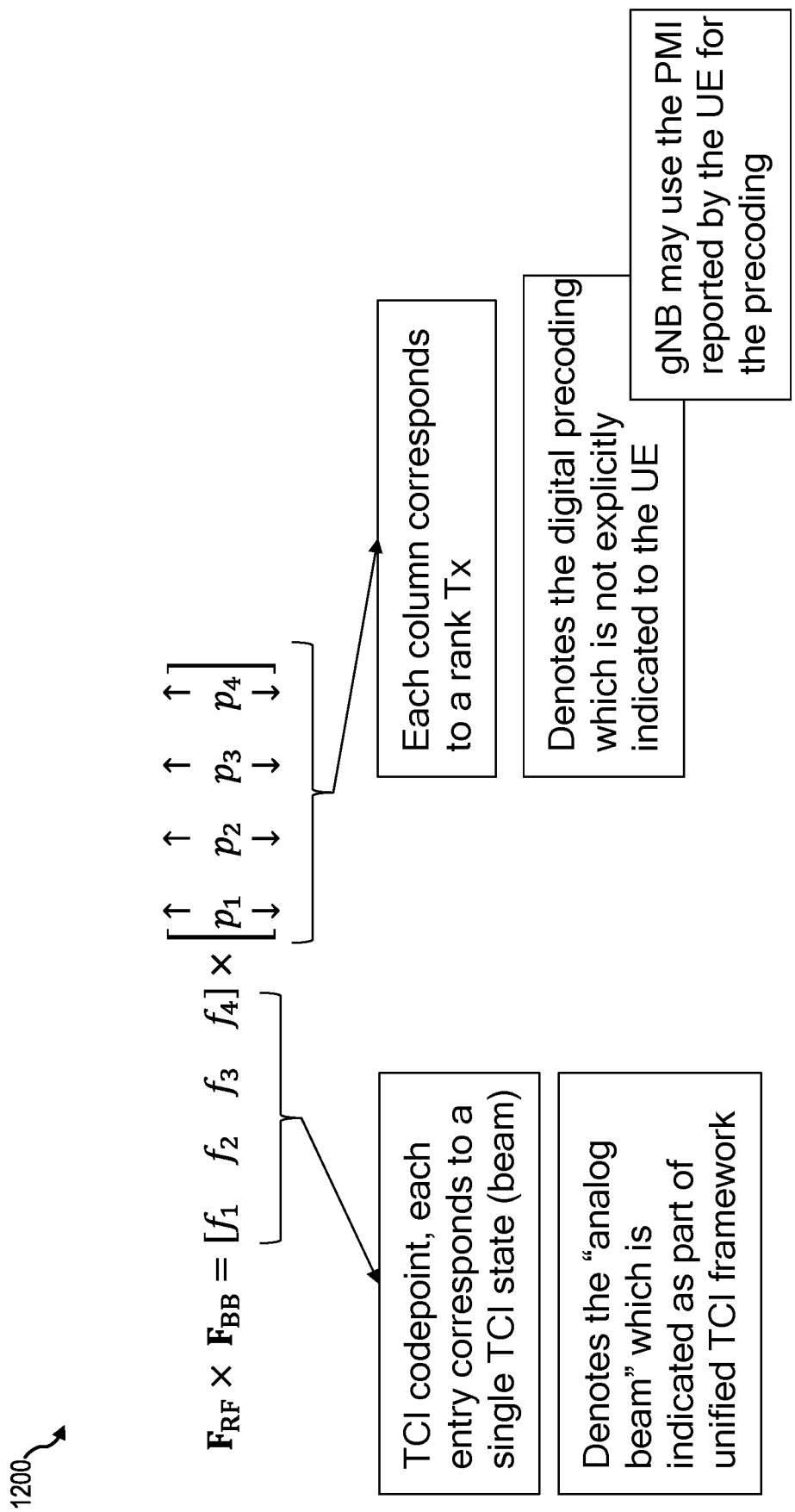
FIG. 12 illustrates an example of a precoder used for a multiple transmit and reception point (mTRP) transmission, in accordance with aspects of the present disclosure.

FIG. 12 illustrates an example of a precoder used for a mTRP transmission to a UE, in accordance with aspects of the present disclosure. In the illustrated example, the mTRP transmission may have an RI of up to four. As illustrated, the precoder may take the form of a radio frequency matrix, $F_{RF}$, multiplied by a baseband matrix, $F_{BB}$. The radio frequency matrix may correspond to a TCI codepoint, and each entry, $f_i$, in the radio frequency matrix may correspond to a single TCI state or beam. The entries in the radio frequency matrix may be considered as describing the "analog beam" that is indicated as part of a unified TCI framework. Each column in the baseband matrix may correspond to a rank transmission. The values, p, in the columns may be considered as describing the digital precoding used at the transmitting network entity (e.g., a gNB or TRP). The digital precoding is not explicitly indicated to the UE in typical communications systems. The network entity may, but is not required to, determine the digital precoding based on a PMI reported by the UE. Depending on the channel or signal (e.g., PDCCH, PDSCH, CSI-RS, etc.) being transmitted and the rank configuration used by the transmitting network entity, the number of columns as well as actual values of $F_{BB}$ could vary and may depend on a network entity (e.g., gNB) implementation. The differing numbers of columns and differing values potentially used for transmitting the mTRP transmission potentially make it desirable for a receiving UE to use multiple different demodulation assumptions.

According to aspects of the present disclosure, when using unified TCI state indication with CJT transmission, a UE reports a single PMI for an RI=N that is fixed, and the UE may expect to receive a CJT PDSCH up to rank N and PDCCH transmissions using the reported PMI.

In aspects of the present disclosure, N may be network-entity-configured or selected by the UE and indicated to the network (e.g., a network entity, such as a gNB) in a CSI report.

According to aspects of the present disclosure, if a network entity transmits a PDSCH having rank M that is less than N, then the network entity uses the first M columns of the precoder corresponding to the PMI reported by the UE as the precoder for the PDSCH that has rank M.

In aspects of the present disclosure, techniques for reporting a strongest layer indication (e.g., LI in typical communications systems) may be adapted to report the order of the layer strengths as observed by the UE. The network entity may then transmit the PDSCH via the M strongest layers and using the corresponding M columns of the precoder indicated by the PMI reported by the UE.

According to aspects of the present disclosure, when transmitting a PDCCH, a single column of the precoder corresponding to the PMI is always used. Which column of the precoder matrix that is to be used for PDCCH transmission may be specified by signaling and/or a rule.

In aspects of the present disclosure, a strongest layer indicator (e.g., LI) may also indicate the layer used for all PDCCH transmissions for a CORESET.

According to aspects of the present disclosure, each CORESET may be configured such that a network entity uses a certain column, of the precoder indicated by the PMI reported by a UE, for transmissions (e.g., transmitting PDCCHs). In some aspects, which column of the precoder that corresponds to a CORESET may be signaled by a network entity to the UE.

In aspects of the present disclosure, each CORESET may be assigned with a certain column, of the precoder indicated by the PMI, according to a rule. For example each CORESET may be assigned to use the column having the column number equal to (CORESET ID mod N) for transmissions (e.g., of PDCCHs by network entities).

According to aspects of the present disclosure, if a transmitting network entity maintains phase coherence across multiple transmissions (e.g., PDSCHs), a receiving UE may bundle DM-RS received with different channels associated with different numbers of ports. The UE may improve reception accuracy and thus coverage of the UE by bundling the DM-RS and demodulating the various channels based on the bundled DM-RS.

In aspects of the present disclosure, additional signaling or rules may indicate to a UE whether the UE may bundle reference signals (e.g., DM-RS) across channels associated with different numbers of ports. For example, a flag in an RRC configuration may indicate a network entity's support for phase continuity across channels associated with differing numbers of ports, thus indicating whether a receiving UE may bundle reference signals received with the channels.

According to aspects of the present disclosure, a UE may bundle reference signals (e.g., DM-RS) across channels associated with different numbers of ports at most times, with a network entity (e.g., a gNB) dynamically indicating to the UE the occasions when the network entity has not maintained phase continuity across channels and the UE should stop bundling reference signals across the channels.

In aspects of the present disclosure, a UE may bundle reference signals (e.g., DM-RS) across channels associated with different numbers of ports in response to certain conditions being satisfied. For example, a UE may bundle reference signals according to a set of rules. In an example, a UE may bundle reference signals (e.g., DM-RS) across channels associated with different numbers of ports when receiving over consecutive DL symbols or slots, but if there are UL slots in the middle of the DL symbols or slots, the UE and the transmitting network entity may assume the phase continuity is broken, and the UE stops bundling the reference signals across the channels.

Figure 13:
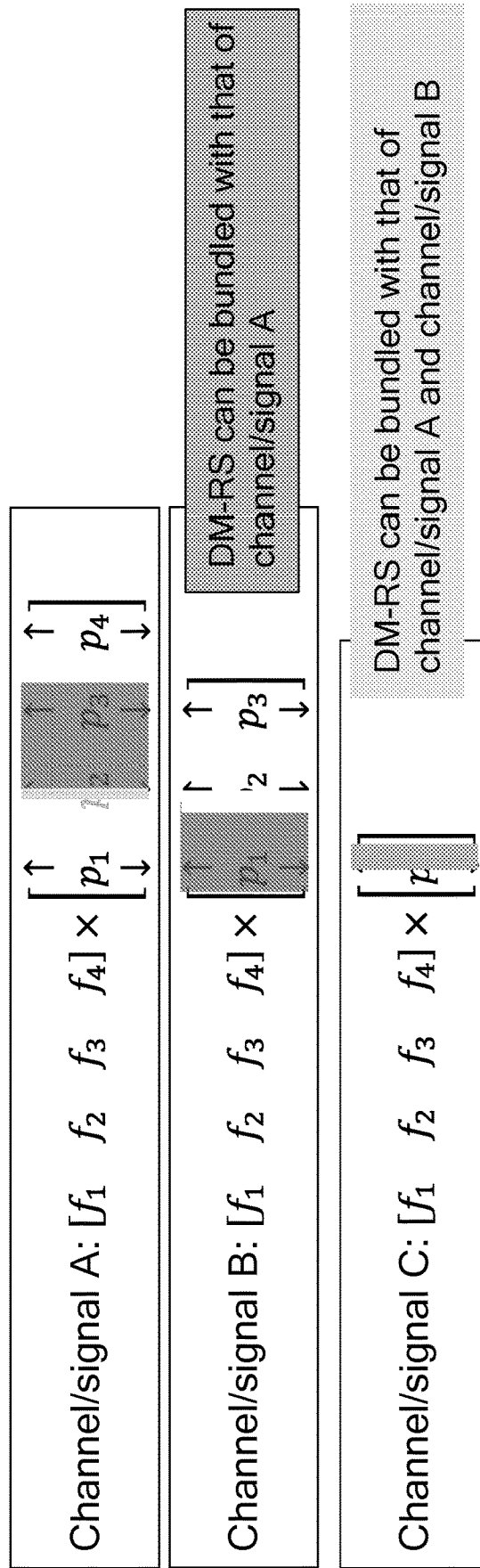
FIG. 13 illustrates bundling of demodulation reference signals (DM-RS) transmitted with channels associated with different numbers of ports, in accordance with aspects of the present disclosure.

FIG. 13 depicts bundling of DM-RS transmitted with channels associated with different numbers of ports, in accordance with aspects of the present disclosure. In the illustrated example, a network entity (e.g., a gNB) transmits three channels or signals (e.g., PDSCHs or PDCCHs), labeled A, B, and C. The network entity transmits the channel or signal A using four ports. The network entity transmits the channel or signal B using three ports and maintaining phase continuity between channel or signal A and channel or signal B. The network entity transmits the channel or signal C using one port and maintaining phase continuity with channel or signal A and channel or signal B. A UE receiving the channels or signals A and B can bundle DM-RS received with channel or signal B with DM-RS received with channel or signal A. Similarly, a UE receiving the channels or signals A, B, and C can bundle DM-RS received with channel or signal C with DM-RS received either or both of channels or signals A and B.

Figure 14:
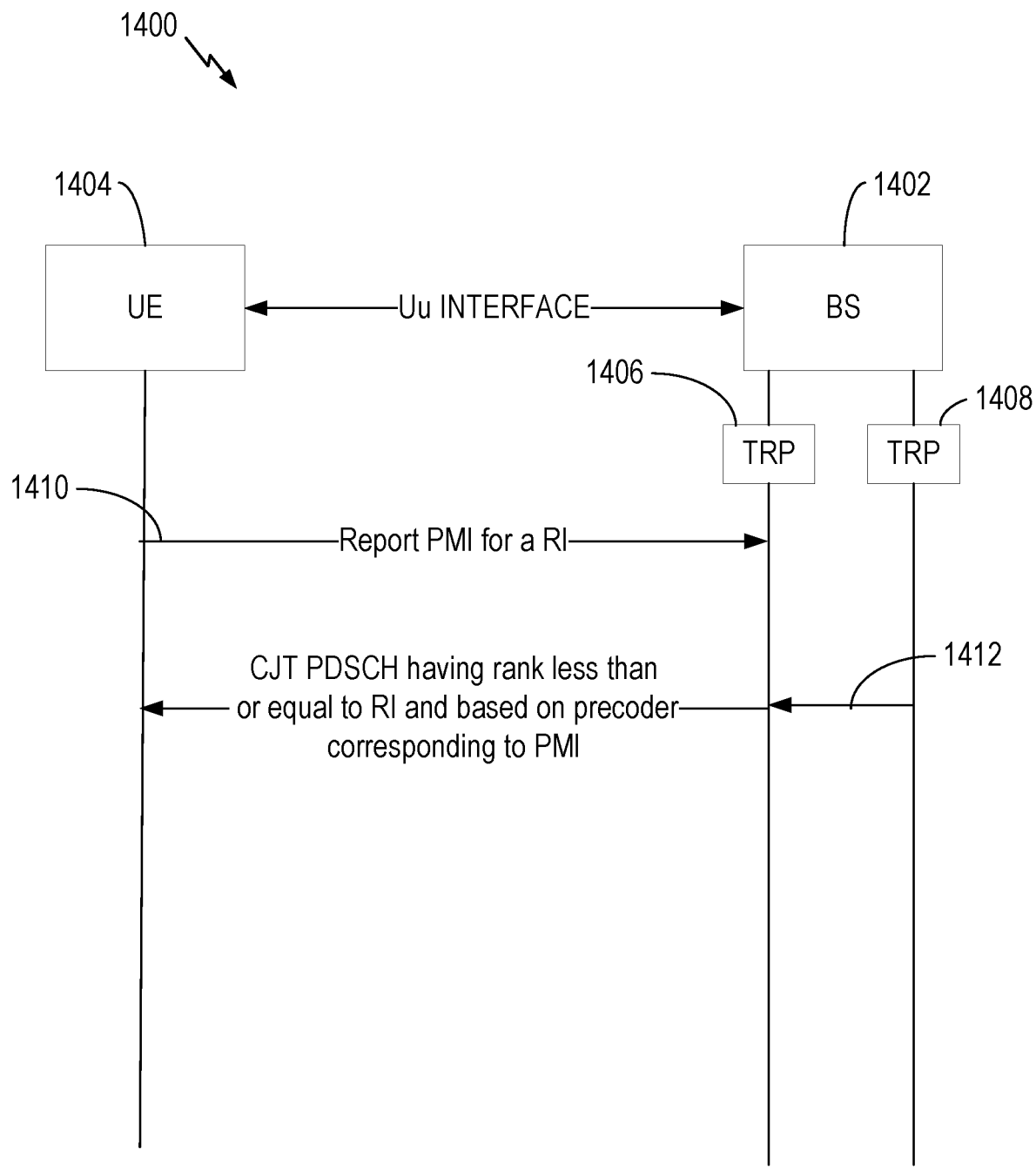
FIG. 14 illustrates an example call flow between a UE and a BS with TRPs, in accordance with aspects of the present disclosure.

FIG. 14 depicts an example call flow between a UE 1404 and a BS 1402 with TRPs 1406 and 1408, in accordance with aspects of the present disclosure. UE 1404 may be an example of the UE 102 shown in FIGS. 1 and 3. BS 1402 may be an example of BS 102, shown in FIGS. 1 and 3, or a disaggregated base station as discussed with respect to FIG. 2. TRPs 1406 and 1408 may be examples of the RUs 240 discussed with respect to FIG. 2. The call flow begins at 1410 with the UE transmitting a report including a PMI for a RI. The UE may, for example, transmit a report including a PMI corresponding to a RI of 4 for the UE to receive a four-layer transmission. At 1412, the BS causes the two TRPs to transmit a CJT PDSCH having a rank that is less than or equal to the RI for which the UE indicated the PMI. The BS causes the two TRPs to transmit the CJT PDSCH based on the PMI, that is, based on the precoder indicated by the PMI. The UE receives the CJT PDSCH based on the PMI, that is, based on the precoder indicated by the PMI in the report the UE transmitted at 1410.

According to aspects of the present disclosure, when using unified TCI state indication with CJT transmission, a UE may report multiple PMIs, one for each RI that is less than or equal to N. For example, if N is four, then a UE may report PMIs for RI=1, RI=2, RI=3, and RI=4.

In aspects of the present disclosure, a UE may include only one PMI based on a single transmit hypothesis in a single report. In such cases, a UE may transmit different reports with a single PMI for different RIs at different times. The UE and a network entity (e.g., a gNB) receiving the different reports may eventually (e.g., after several reports are transmitted) each know a PMI corresponding to each RI that is less than or equal to N.

According to aspects of the present disclosure, a UE may be configured to report multiple PMIs, one PMI for each RI value. For example, a UE may be configured to report N PMIs, each PMI corresponding to a different RI for RI=1 to N.

In aspects of the present disclosure, when a UE reports multiple PMIs, each PMI corresponding to a different RI, a network entity (e.g., gNB) may use the PMI corresponding to the rank of the channel (e.g., a PDSCH) to be transmitted to the UE.

According to aspects of the present disclosure, when a UE reports multiple PMIs, each PMI corresponding to a different RI, a network entity (e.g., a gNB) may use the PMI corresponding to an RI of one for transmitting a PDCCH to the UE.

In aspects of the present disclosure, when a UE reports multiple PMIs, each PMI corresponding to a different RI, a UE may not bundle DMRS across channels associated with different numbers of ports. Such a UE may bundle channels that are each associated with a same number of ports.

Figure 15:
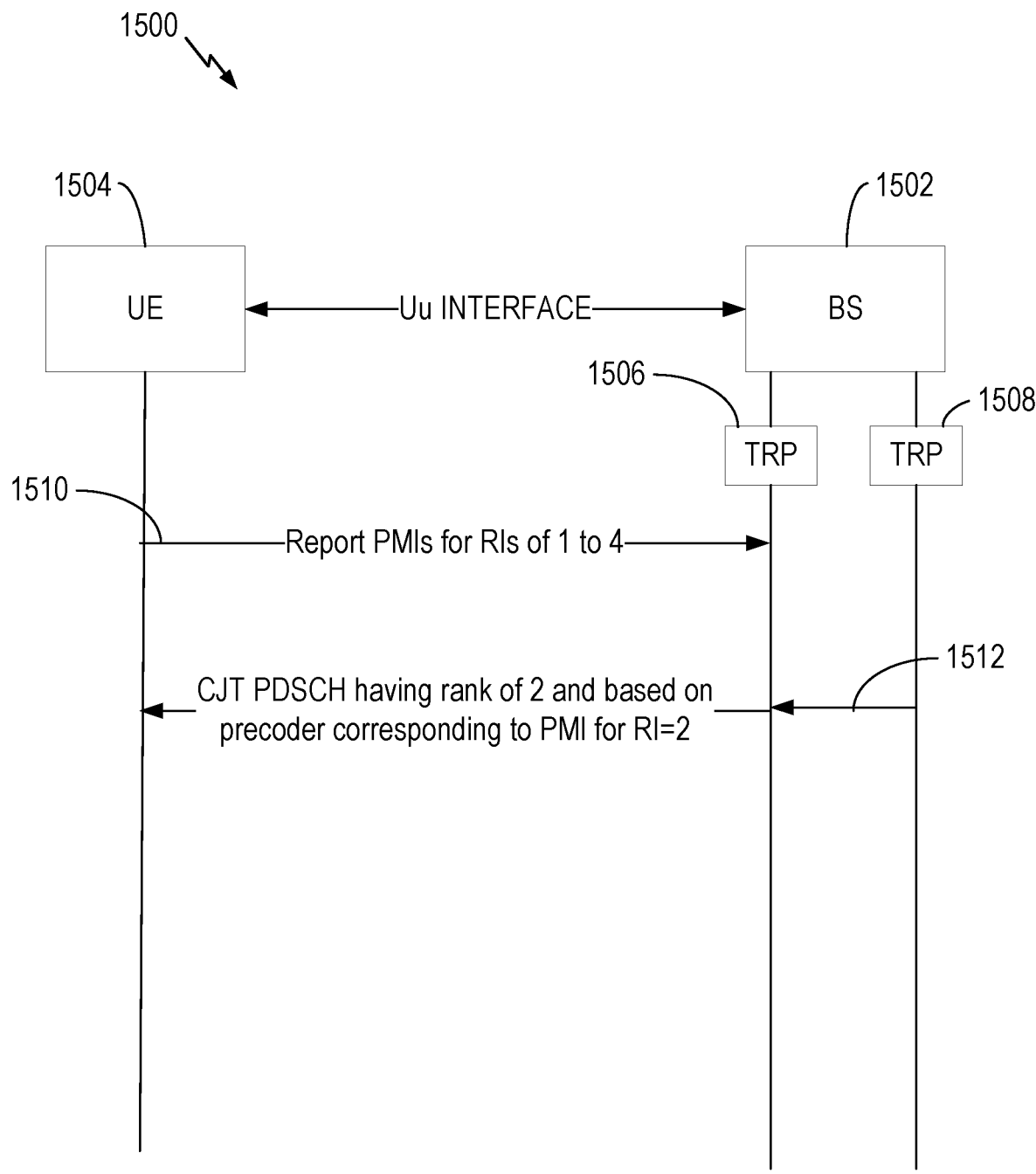
FIG. 15 illustrates an example call flow between a UE and a BS with TRPs, in accordance with aspects of the present disclosure.

FIG. 15 depicts an example call flow between a UE 1504 and a BS 1502 with TRPs 1506 and 1508, in accordance with aspects of the present disclosure. UE 1504 may be an example of the UE 102 shown in FIGS. 1 and 3. BS 1502 may be an example of BS 102, shown in FIGS. 1 and 3, or a disaggregated base station as discussed with respect to FIG. 2. TRPs 1506 and 1508 may be examples of the RUs 240 discussed with respect to FIG. 2. The call flow begins at 1510 with the UE transmitting a report including a PMI for a RI. The UE may, for example, transmit a report including a one or more PMIs, each PMI corresponding to a different RI having values of 1 to 4 for the UE to receive a one-, two-, three-, or four-layer transmission. At 1512, the BS causes the two TRPs to transmit a CJT PDSCH having a rank of two and based on the precoder indicated by the PMI corresponding to the RI=2. The UE receives the CJT PDSCH based on the PMI, that is, based on the precoder indicated by the PMI corresponding to the RI of 2 in the report the UE transmitted at 1510.

According to aspects of the present disclosure, when using unified TCI state indication with CJT transmission, a transmitting network entity (e.g., a gNB) may implicitly indicate a precoder choice to the receiving UE. For example, a network entity may indicate, to a UE, a TCI by transmitting a TCI codepoint x as part of a unified TCI state indication via a DCI in a slot number n1. In the example, until a next indication of a TCI state, the UE may assume that the network entity uses the same precoder corresponding to the PMI of the TCI state. So, if the TCI state indicates the network entity is using PMI-1, then the UE may assume the network entity uses PMI-1 from slot number n1+k into the indefinite future.

In aspects of the present disclosure, an implicit indication of a precoder choice as described herein may be interpreted, by a UE, as a signal to perform DM-RS bundling for signals and/or channels transmitted in slot n1+k and later slots.

According to aspects of the present disclosure, if the network entity indicates, to the UE, the same TCI codepoint x in a later slot number n2, the UE may assume that the network entity has changed the applicable precoder even though the TCI indicated is the same TCI as the TCI that was previously indicated.

In aspects of the present disclosure, if a network entity indicates a new TCI state (e.g., TCI codepoint y≠x), then the UE may assume that the precoder has been changed by the network entity.

Figure 16:
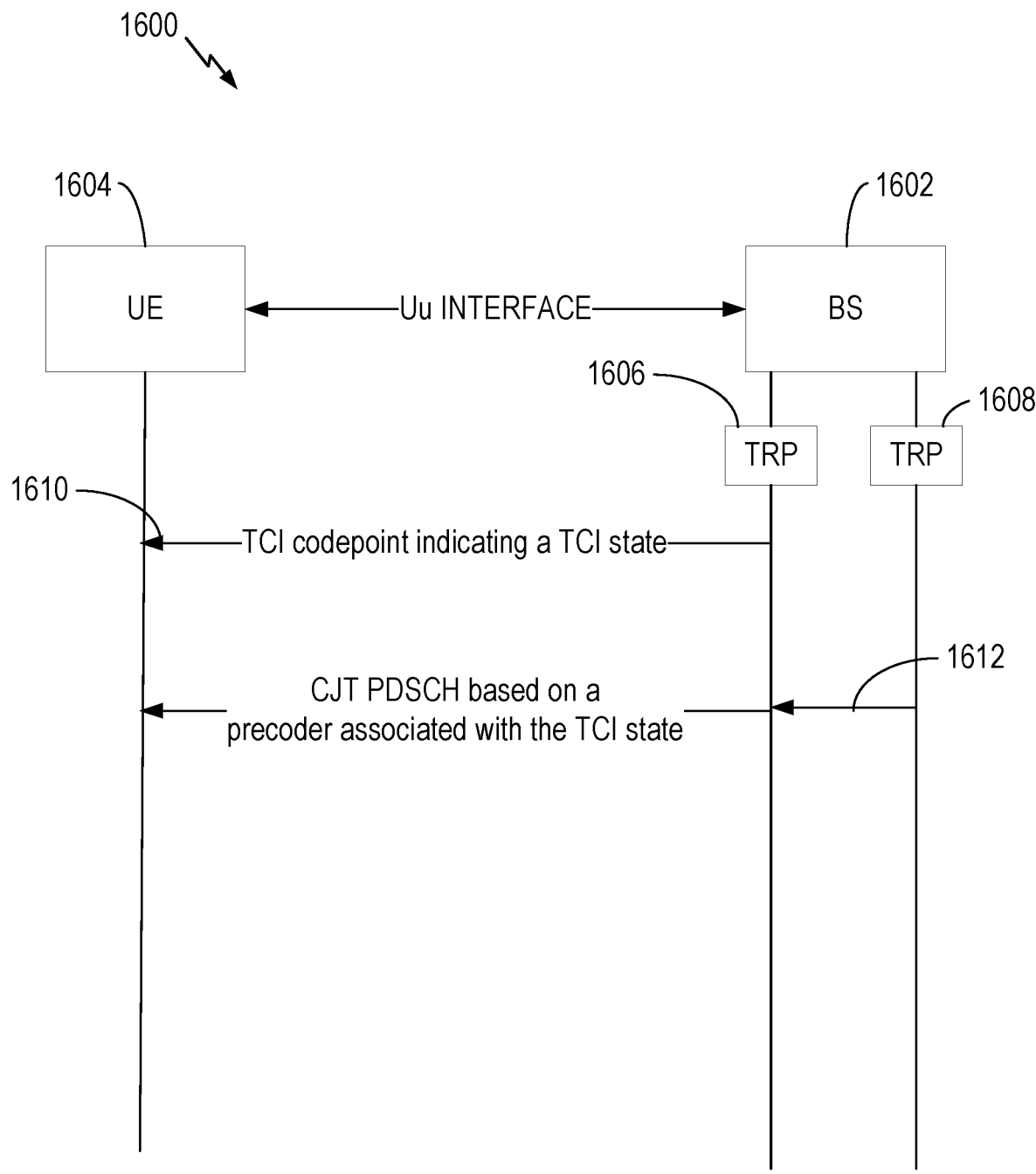
FIG. 16 depicts an example call flow between a UE and a BS with TRPs, in accordance with aspects of the present disclosure.

FIG. 16 depicts an example call flow between a UE 1604 and a BS 1602 with TRPs 1606 and 1608, in accordance with aspects of the present disclosure. UE 1604 may be an example of the UE 102 shown in FIGS. 1 and 3. BS 1602 may be an example of BS 102, shown in FIGS. 1 and 3, or a disaggregated base station as discussed with respect to FIG. 2. TRPs 1606 and 1608 may be examples of the RUs 240 discussed with respect to FIG. 2. The call flow begins at 1610 with the BS causing at least one of the TRPs to transmit and the UE receiving a TCI codepoint indicating a TCI state during a first slot. At 1612, the BS causes the two TRPs to transmit a CJT PDSCH based on a precoder associated with the TCI state. The UE receives the CJT PDSCH based on the precoder associated with the TCI state that the UE received at 1510.

Example Operations

Figure 17:
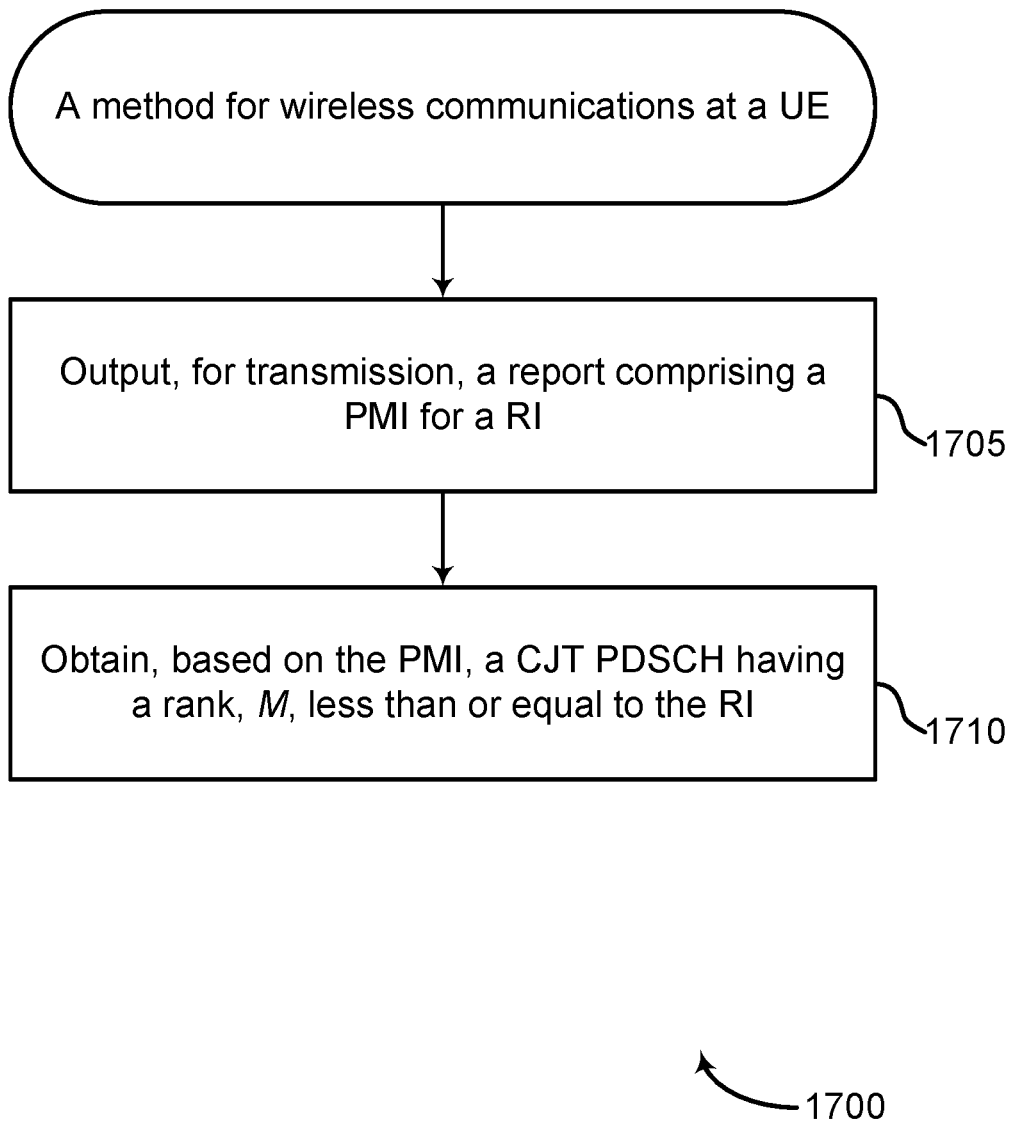
FIG. 17 depicts a method for wireless communications.

FIG. 17 shows an example of a method 1700 of wireless communication at a UE, such as a UE 104 of FIGS. 1 and 3.

Method 1700 begins at step 1705 with outputting, for transmission, a report comprising a PMI for a RI. In some cases, the operations of this step refer to, or may be performed by, circuitry for outputting and/or code for outputting as described with reference to FIG. 23.

Method 1700 then proceeds to step 1710 with obtaining, based on the PMI, a CJT PDSCH having a rank, M, less than or equal to the RI. In some cases, the operations of this step refer to, or may be performed by, circuitry for obtaining and/or code for obtaining as described with reference to FIG. 23.

In some aspects, the method 1700 further includes obtaining, based on the PMI, a PDCCH. In some cases, the operations of this step refer to, or may be performed by, circuitry for obtaining and/or code for obtaining as described with reference to FIG. 23.

In some aspects, obtaining the PDCCH is further based on a single column of a precoding matrix indicated by the PMI.

In some aspects, the method 1700 further includes obtaining a multi-layer transmission, wherein the single column of the precoding matrix corresponds to a strongest layer of the multi-layer transmission. In some cases, the operations of this step refer to, or may be performed by, circuitry for obtaining and/or code for obtaining as described with reference to FIG. 23.

In some aspects, the single column is indicated in a CORESET configuration of a CORESET via which the PDCCH was obtained.

In some aspects, the single column is based on a CORESET via which the PDCCH was obtained.

In some aspects, the method 1700 further includes obtaining a configuration indicating the RI prior to outputting the report. In some cases, the operations of this step refer to, or may be performed by, circuitry for obtaining and/or code for obtaining as described with reference to FIG. 23.

In some aspects, the method 1700 further includes outputting, for transmission, a CSI report indicating the RI prior to outputting the report. In some cases, the operations of this step refer to, or may be performed by, circuitry for outputting and/or code for outputting as described with reference to FIG. 23.

In some aspects, M is less than the RI; and the CJT PDSCH is obtained based on the first M columns of a precoding matrix indicated by the PMI.

In some aspects, the method 1700 further includes obtaining a multi-layer transmission. In some cases, the operations of this step refer to, or may be performed by, circuitry for obtaining and/or code for obtaining as described with reference to FIG. 23.

In some aspects, the method 1700 further includes outputting, for transmission, a report comprising an order of strengths of layers of the multi-layer transmission, wherein the CJT PDSCH is obtained further based on the M strongest layers, according to the order of strengths. In some cases, the operations of this step refer to, or may be performed by, circuitry for outputting and/or code for outputting as described with reference to FIG. 23.

In some aspects, the method 1700 further includes obtaining one or more first DM-RS with another channel that is associated with a first number of ports. In some cases, the operations of this step refer to, or may be performed by, circuitry for obtaining and/or code for obtaining as described with reference to FIG. 23.

In some aspects, the method 1700 further includes obtaining one or more second DM-RS with the CJT PDSCH, wherein: the CJT PDSCH is associated with a second number of ports; and the CJT PDSCH is obtained further based on the one or more first DM-RS bundled with the one or more second DM-RS. In some cases, the operations of this step refer to, or may be performed by, circuitry for obtaining and/or code for obtaining as described with reference to FIG. 23.

In some aspects, the method 1700 further includes obtaining an indication to bundle the first DM-RS with the second DM-RS. In some cases, the operations of this step refer to, or may be performed by, circuitry for obtaining and/or code for obtaining as described with reference to FIG. 23.

Figure 23:
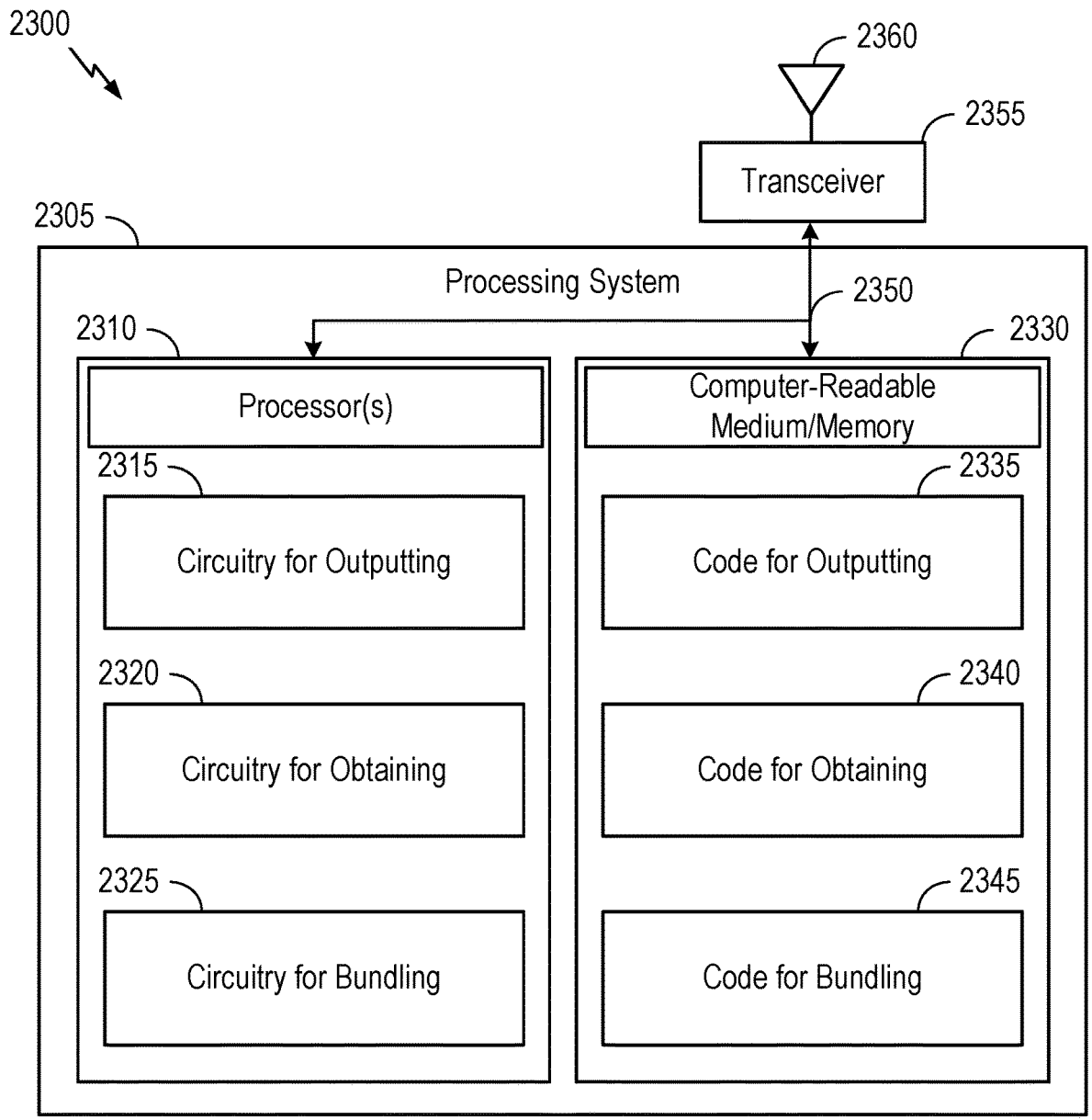
FIG. 23 depicts aspects of an example communications device.

In one aspect, method 1700, or any aspect related to it, may be performed by an apparatus, such as communications device 2300 of FIG. 23, which includes various components operable, configured, or adapted to perform the method 1700. Communications device 2300 is described below in further detail.

Note that FIG. 17 is just one example of a method, and other methods including fewer, additional, or alternative steps are possible consistent with this disclosure.

Figure 18:
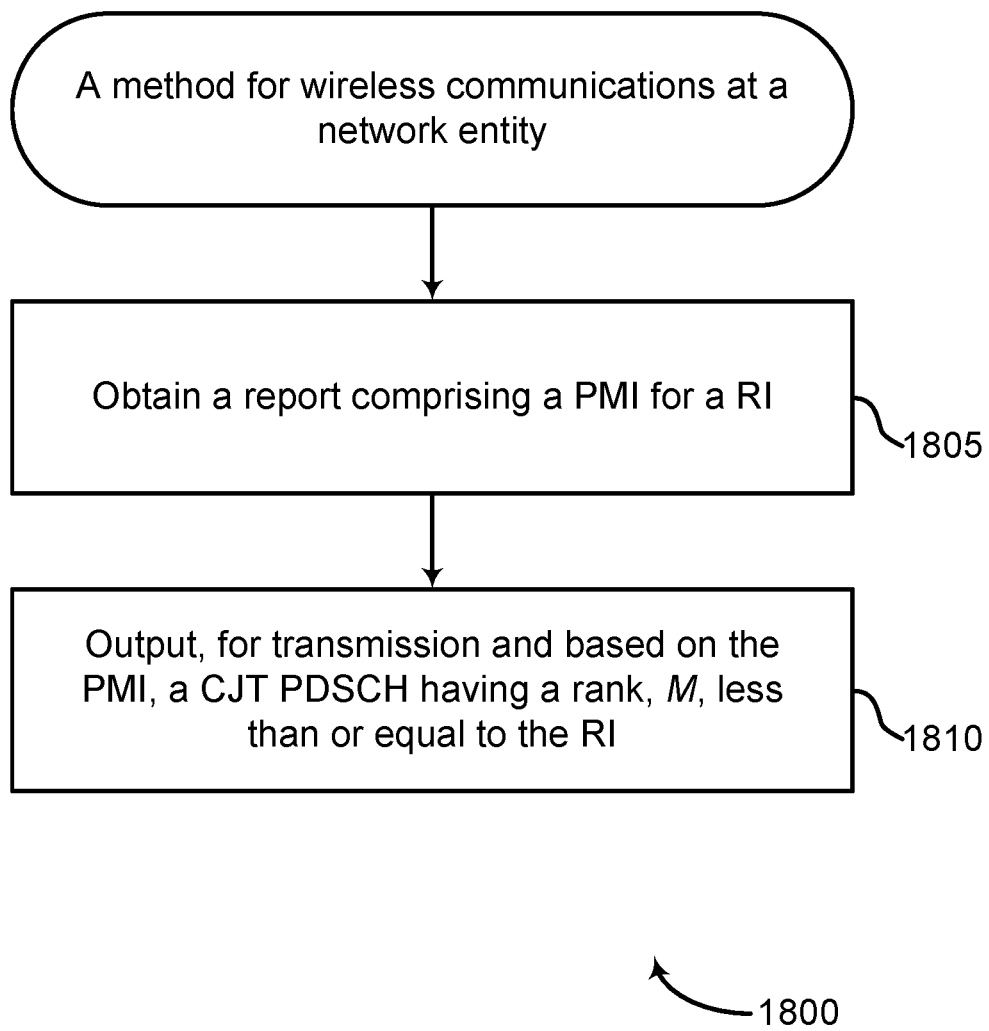
FIG. 18 depicts a method for wireless communications.

FIG. 18 shows an example of a method 1800 of wireless communication at a network entity, such as a BS 102 of FIGS. 1 and 3, or a disaggregated base station as discussed with respect to FIG. 2.

Method 1800 begins at step 1805 with obtaining a report comprising a PMI for a RI. In some cases, the operations of this step refer to, or may be performed by, circuitry for obtaining and/or code for obtaining as described with reference to FIG. 24.

Method 1800 then proceeds to step 1810 with outputting, for transmission and based on the PMI, a CJT PDSCH having a rank, M, less than or equal to the RI. In some cases, the operations of this step refer to, or may be performed by, circuitry for outputting and/or code for outputting as described with reference to FIG. 24.

In some aspects, the method 1800 further includes outputting, for transmission and based on the PMI, a PDCCH. In some cases, the operations of this step refer to, or may be performed by, circuitry for outputting and/or code for outputting as described with reference to FIG. 24.

In some aspects, outputting the PDCCH is further based on a single column of a precoding matrix indicated by the PMI.

In some aspects, the method 1800 further includes obtaining an indication of a strongest layer of a multi-layer transmission, wherein the single column of the precoding matrix corresponds to the strongest layer. In some cases, the operations of this step refer to, or may be performed by, circuitry for obtaining and/or code for obtaining as described with reference to FIG. 24.

In some aspects, the method 1800 further includes indicating the single column in a CORESET configuration of a CORESET via which the PDCCH is transmitted. In some cases, the operations of this step refer to, or may be performed by, circuitry for indicating and/or code for indicating as described with reference to FIG. 24.

In some aspects, the single column is determined based on a CORESET via which the PDCCH is transmitted.

In some aspects, the method 1800 further includes outputting, for transmission, a configuration indicating the RI prior to obtaining the report. In some cases, the operations of this step refer to, or may be performed by, circuitry for outputting and/or code for outputting as described with reference to FIG. 24.

In some aspects, the method 1800 further includes obtaining a CSI report indicating the RI prior to obtaining the report. In some cases, the operations of this step refer to, or may be performed by, circuitry for obtaining and/or code for obtaining as described with reference to FIG. 24.

In some aspects, M is less than the RI; and the CJT PDSCH is output further based on the first M columns of a precoding matrix indicated by the PMI.

In some aspects, the method 1800 further includes obtaining a report comprising an order of strengths of layers of a multi-layer transmission, wherein the CJT PDSCH is output further based on the M strongest layers, according to the order of strengths. In some cases, the operations of this step refer to, or may be performed by, circuitry for obtaining and/or code for obtaining as described with reference to FIG. 24.

In some aspects, the method 1800 further includes outputting, for transmission, an indication to bundle reference signals received with two or more channels associated with differing numbers of ports. In some cases, the operations of this step refer to, or may be performed by, circuitry for outputting and/or code for outputting as described with reference to FIG. 24.

Figure 24:
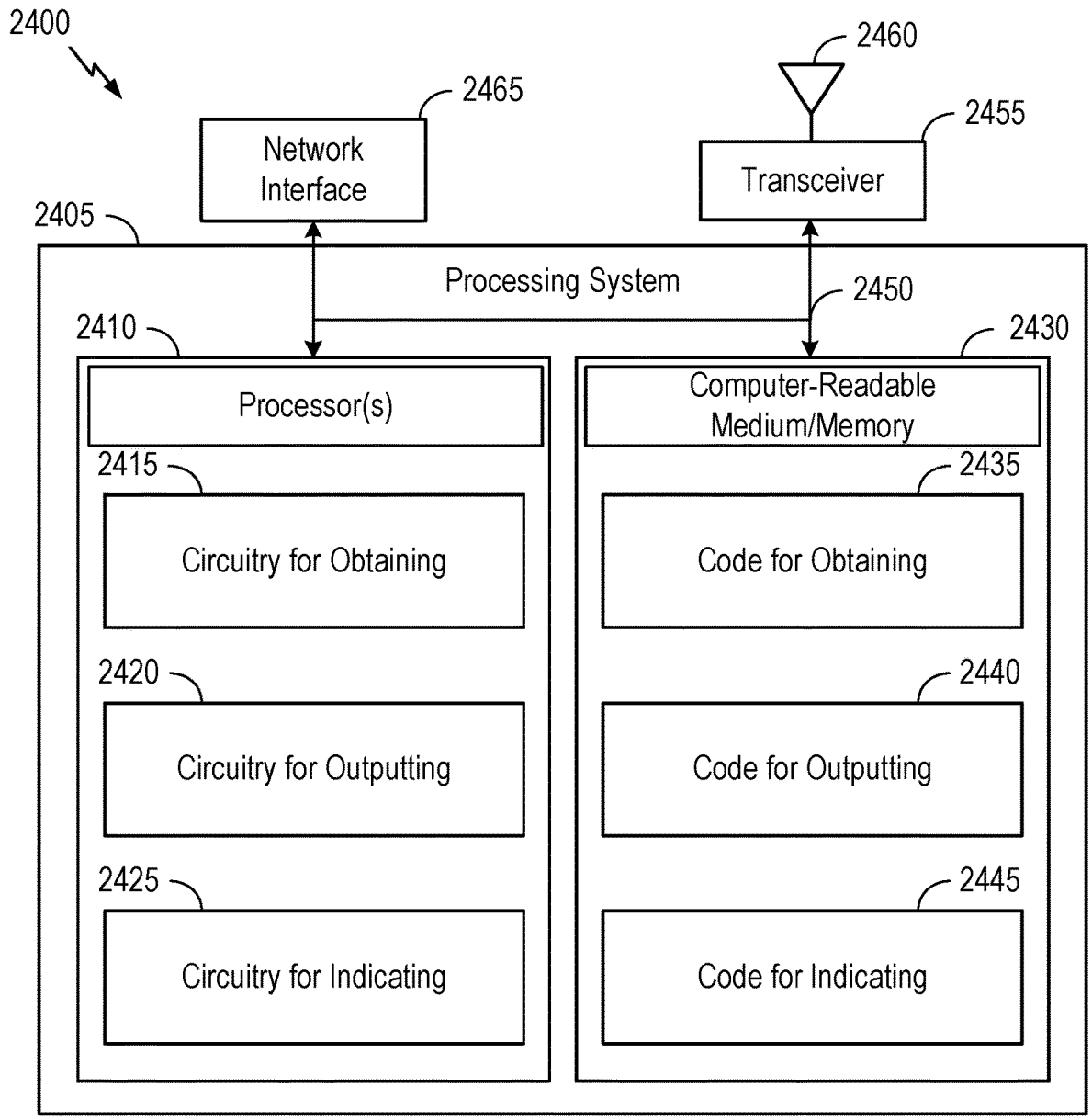
FIG. 24 depicts aspects of an example communications device.

In one aspect, method 1800, or any aspect related to it, may be performed by an apparatus, such as communications device 2400 of FIG. 24, which includes various components operable, configured, or adapted to perform the method 1800. Communications device 2400 is described below in further detail.

Note that FIG. 18 is just one example of a method, and other methods including fewer, additional, or alternative steps are possible consistent with this disclosure.

Figure 19:
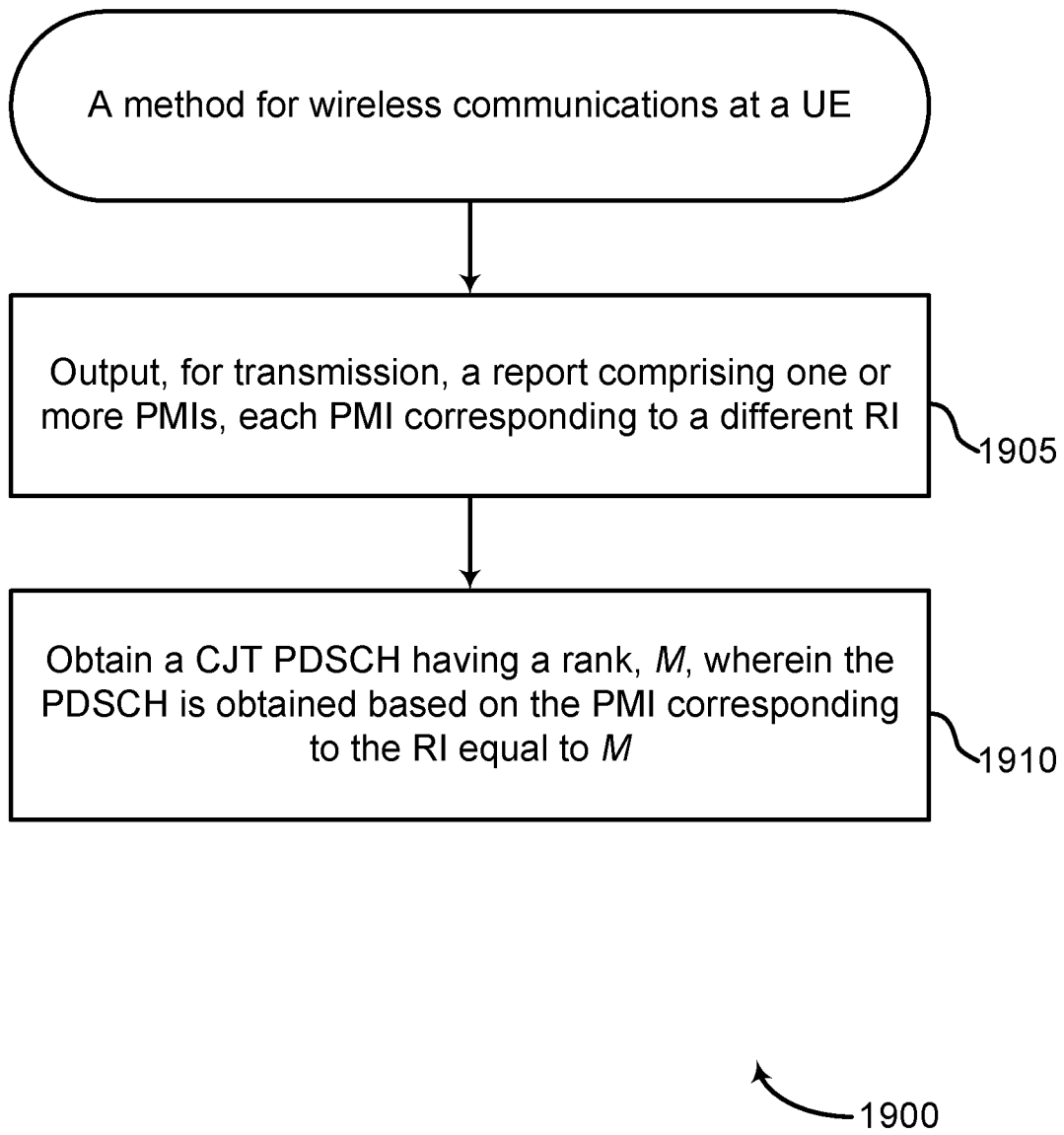
FIG. 19 depicts a method for wireless communications.

FIG. 19 shows an example of a method 1900 of wireless communication at a UE, such as a UE 104 of FIGS. 1 and 3.

Method 1900 begins at step 1905 with outputting, for transmission, a report comprising one or more PMIs, each PMI corresponding to a different RI. In some cases, the operations of this step refer to, or may be performed by, circuitry for outputting and/or code for outputting as described with reference to FIG. 23.

Method 1900 then proceeds to step 1910 with obtaining a CJT PDSCH having a rank, M, wherein the PDSCH is obtained based on the PMI corresponding to the RI equal to M. In some cases, the operations of this step refer to, or may be performed by, circuitry for obtaining and/or code for obtaining as described with reference to FIG. 23.

In some aspects, the method 1900 further includes obtaining, based on the PMI corresponding to the RI indicating a rank of one, a PDCCH. In some cases, the operations of this step refer to, or may be performed by, circuitry for obtaining and/or code for obtaining as described with reference to FIG. 23.

In some aspects, the method 1900 further includes obtaining one or more first DM-RS with another channel that is associated with one or more ports. In some cases, the operations of this step refer to, or may be performed by, circuitry for obtaining and/or code for obtaining as described with reference to FIG. 23.

In some aspects, the method 1900 further includes obtaining one or more second DM-RS with the CJT PDSCH, wherein: the CJT PDSCH is also associated with the one or more ports; and the CJT PDSCH is obtained further based on the one or more first DM-RS bundled with the one or more second DM-RS. In some cases, the operations of this step refer to, or may be performed by, circuitry for obtaining and/or code for obtaining as described with reference to FIG. 23.

In one aspect, method 1900, or any aspect related to it, may be performed by an apparatus, such as communications device 2300 of FIG. 23, which includes various components operable, configured, or adapted to perform the method 1900. Communications device 2300 is described below in further detail.

Note that FIG. 19 is just one example of a method, and other methods including fewer, additional, or alternative steps are possible consistent with this disclosure.

Figure 20:
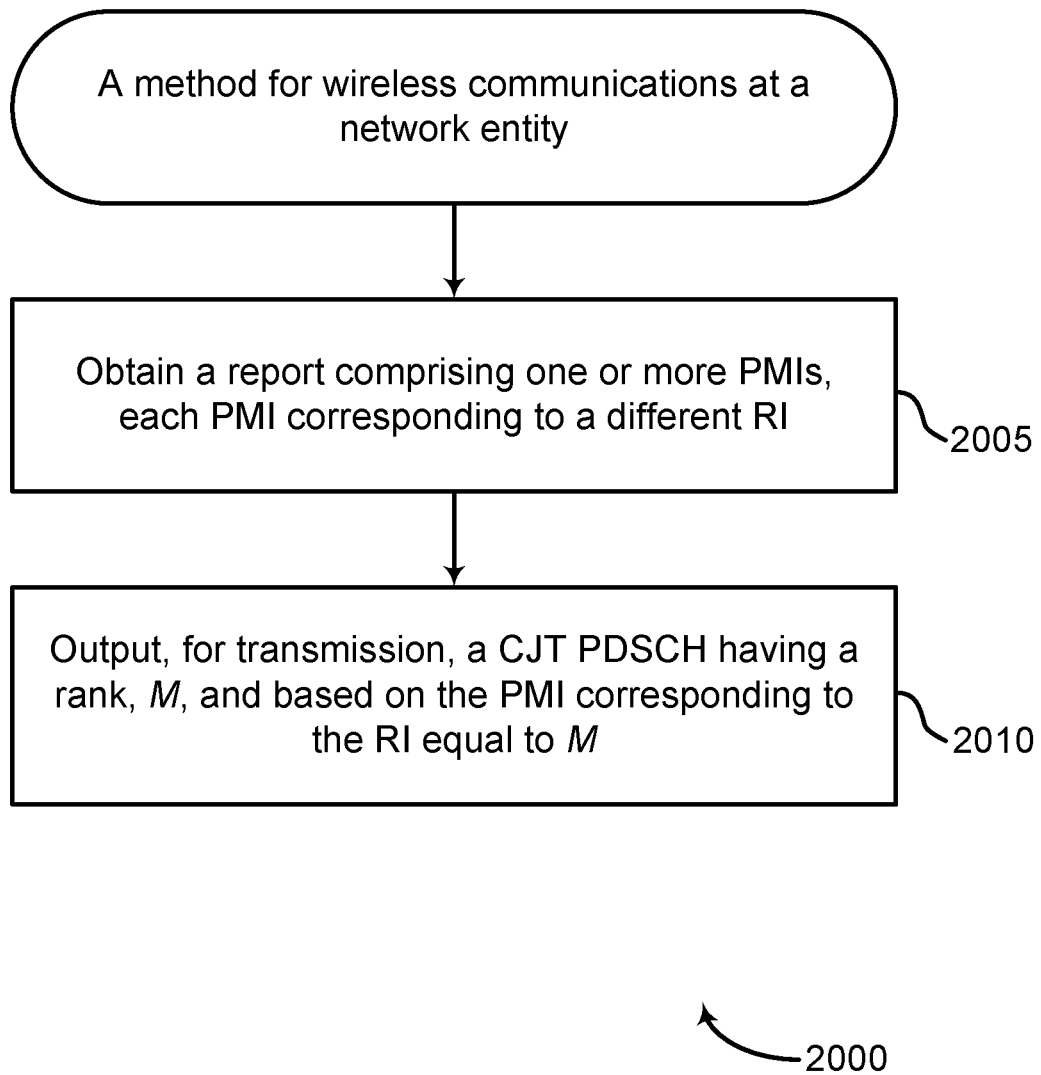
FIG. 20 depicts a method for wireless communications.

FIG. 20 shows an example of a method 2000 of wireless communication at a network entity, such as a BS 102 of FIGS. 1 and 3, or a disaggregated base station as discussed with respect to FIG. 2.

Method 2000 begins at step 2005 with obtaining a report comprising one or more PMIs, each PMI corresponding to a different RI. In some cases, the operations of this step refer to, or may be performed by, circuitry for obtaining and/or code for obtaining as described with reference to FIG. 24.

Method 2000 then proceeds to step 2010 with outputting, for transmission, a CJT PDSCH having a rank, M, and based on the PMI corresponding to the RI equal to M. In some cases, the operations of this step refer to, or may be performed by, circuitry for outputting and/or code for outputting as described with reference to FIG. 24.

In some aspects, the method 2000 further includes outputting, for transmission and based on the PMI corresponding to the RI indicating a rank of one, a PDCCH. In some cases, the operations of this step refer to, or may be performed by, circuitry for outputting and/or code for outputting as described with reference to FIG. 24.

In one aspect, method 2000, or any aspect related to it, may be performed by an apparatus, such as communications device 2400 of FIG. 24, which includes various components operable, configured, or adapted to perform the method 2000. Communications device 2400 is described below in further detail.

Note that FIG. 20 is just one example of a method, and other methods including fewer, additional, or alternative steps are possible consistent with this disclosure.

Figure 21:
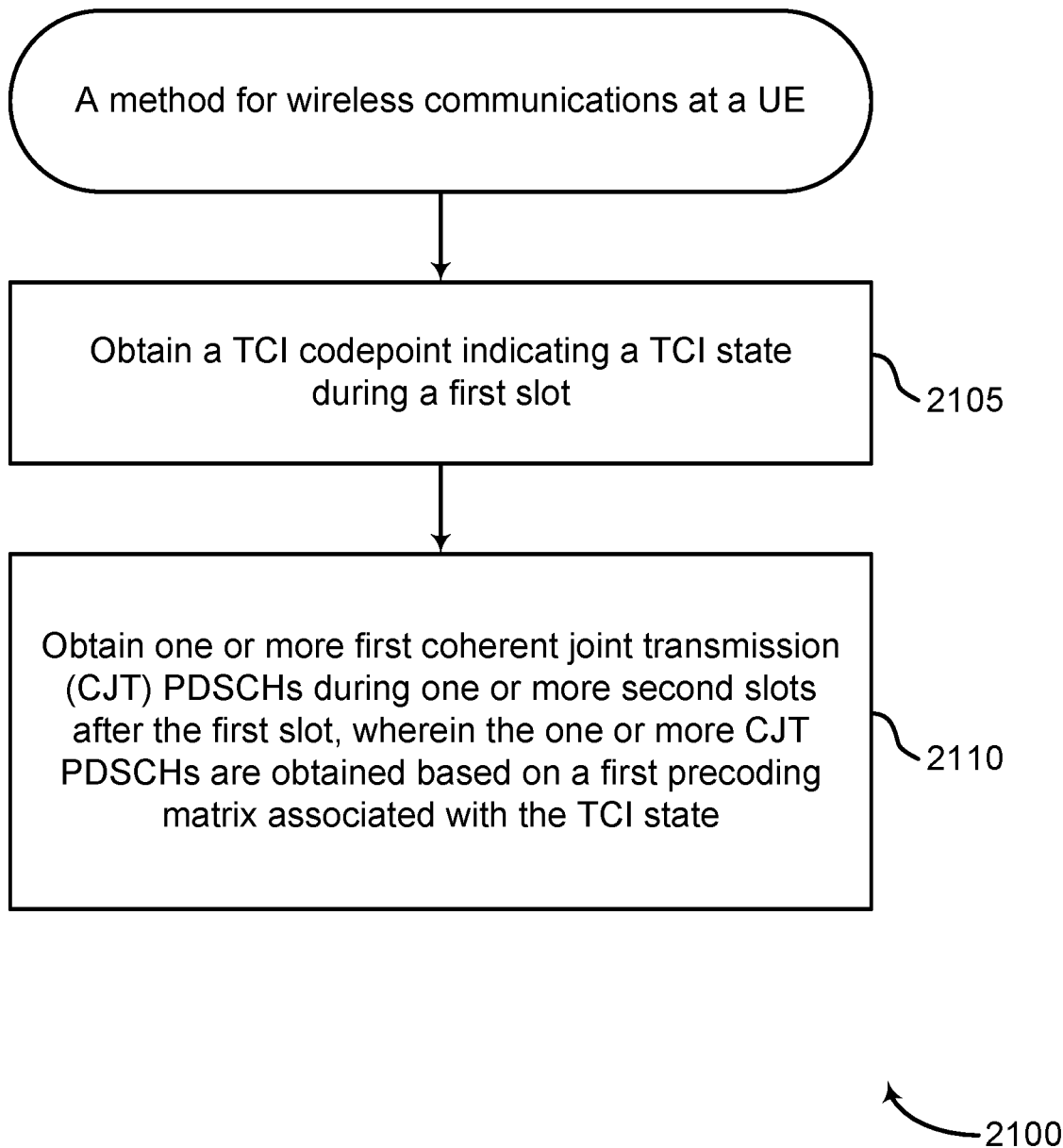
FIG. 21 depicts a method for wireless communications.

FIG. 21 shows an example of a method 2100 of wireless communication at a UE, such as a UE 104 of FIGS. 1 and 3.

Method 2100 begins at step 2105 with obtaining a TCI codepoint indicating a TCI state during a first slot. In some cases, the operations of this step refer to, or may be performed by, circuitry for obtaining and/or code for obtaining as described with reference to FIG. 23.

Method 2100 then proceeds to step 2110 with obtaining one or more first coherent joint transmission (CJT) PDSCHs during one or more second slots after the first slot, wherein the one or more first CJT PDSCHs are obtained based on a first precoding matrix associated with the TCI state. In some cases, the operations of this step refer to, or may be performed by, circuitry for obtaining and/or code for obtaining as described with reference to FIG. 23.

In some aspects, the method 2100 further includes obtaining one or more first DM-RS with the one or more first CJT PDSCHs. In some cases, the operations of this step refer to, or may be performed by, circuitry for obtaining and/or code for obtaining as described with reference to FIG. 23.

In some aspects, the method 2100 further includes obtaining one or more second DM-RS with one or more other channels. In some cases, the operations of this step refer to, or may be performed by, circuitry for obtaining and/or code for obtaining as described with reference to FIG. 23.

In some aspects, the method 2100 further includes bundling, based on the TCI codepoint, the one or more first DM-RS and the one or more second DM-RS, wherein the one or more first CJT PDSCHs are obtained based on the bundled two or more DM-RS. In some cases, the operations of this step refer to, or may be performed by, circuitry for bundling and/or code for bundling as described with reference to FIG. 23.

In some aspects, the method 2100 further includes obtaining the TCI codepoint during a third slot later than the one or more second slots. In some cases, the operations of this step refer to, or may be performed by, circuitry for obtaining and/or code for obtaining as described with reference to FIG. 23.

In some aspects, the method 2100 further includes obtaining one or more second CJT PDSCHs, during the third slot or a later slot, based on a second precoding matrix associated with the TCI state. In some cases, the operations of this step refer to, or may be performed by, circuitry for obtaining and/or code for obtaining as described with reference to FIG. 23.

In one aspect, method 2100, or any aspect related to it, may be performed by an apparatus, such as communications device 2300 of FIG. 23, which includes various components operable, configured, or adapted to perform the method 2100. Communications device 2300 is described below in further detail.

Note that FIG. 21 is just one example of a method, and other methods including fewer, additional, or alternative steps are possible consistent with this disclosure.

Figure 22:
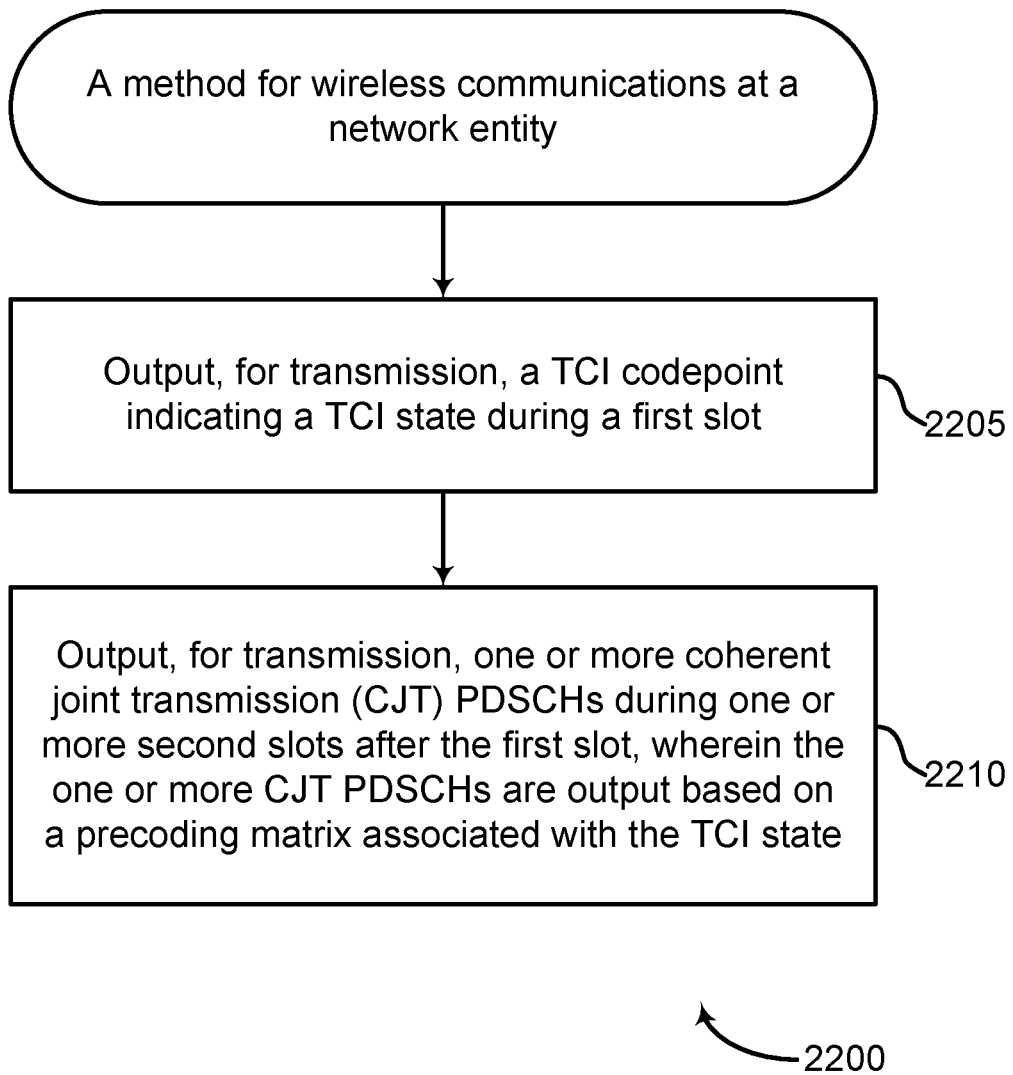
FIG. 22 depicts a method for wireless communications.

FIG. 22 shows an example of a method 2200 of wireless communication at a network entity, such as a BS 102 of FIGS. 1 and 3, or a disaggregated base station as discussed with respect to FIG. 2.

Method 2200 begins at step 2205 with outputting, for transmission, a TCI codepoint indicating a TCI state during a first slot. In some cases, the operations of this step refer to, or may be performed by, circuitry for outputting and/or code for outputting as described with reference to FIG. 24.

Method 2200 then proceeds to step 2210 with outputting, for transmission, one or more coherent joint transmission (CJT) PDSCHs during one or more second slots after the first slot, wherein the one or more CJT PDSCHs are output based on a precoding matrix associated with the TCI state. In some cases, the operations of this step refer to, or may be performed by, circuitry for outputting and/or code for outputting as described with reference to FIG. 24.

In some aspects, the method 2200 further includes outputting, for transmission, the TCI codepoint during a third slot later than the one or more second slots. In some cases, the operations of this step refer to, or may be performed by, circuitry for outputting and/or code for outputting as described with reference to FIG. 24.

In some aspects, the method 2200 further includes outputting, for transmission, one or more second CJT PDSCHs, during the third slot or a later slot, based on a second precoding matrix associated with the TCI state. In some cases, the operations of this step refer to, or may be performed by, circuitry for outputting and/or code for outputting as described with reference to FIG. 24.

In one aspect, method 2200, or any aspect related to it, may be performed by an apparatus, such as communications device 2400 of FIG. 24, which includes various components operable, configured, or adapted to perform the method 2200. Communications device 2400 is described below in further detail.

Note that FIG. 22 is just one example of a method, and other methods including fewer, additional, or alternative steps are possible consistent with this disclosure.

Example Communications Device

FIG. 23 depicts aspects of an example communications device 2300. In some aspects, communications device 2300 is a user equipment, such as UE 104 described above with respect to FIGS. 1 and 3.

The communications device 2300 includes a processing system 2305 coupled to the transceiver 2355 (e.g., a transmitter and/or a receiver). The transceiver 2355 is configured to transmit and receive signals for the communications device 2300 via the antenna 2360, such as the various signals as described herein. The processing system 2305 may be configured to perform processing functions for the communications device 2300, including processing signals received and/or to be transmitted by the communications device 2300.

The processing system 2305 includes one or more processors 2310. In various aspects, the one or more processors 2310 may be representative of one or more of receive processor 358, transmit processor 364, TX MIMO processor 366, and/or controller/processor 380, as described with respect to FIG. 3. The one or more processors 2310 are coupled to a computer-readable medium/memory 2330 via a bus 2350. In certain aspects, the computer-readable medium/memory 2330 is configured to store instructions (e.g., computer-executable code) that when executed by the one or more processors 2310, cause the one or more processors 2310 to perform the method 1700 described with respect to FIG. 17, or any aspect related to it; the method 1900 described with respect to FIG. 19, or any aspect related to it; and the method 2100 described with respect to FIG. 21, or any aspect related to it. Note that reference to a processor performing a function of communications device 2300 may include one or more processors 2310 performing that function of communications device 2300.

In the depicted example, computer-readable medium/memory 2330 stores code (e.g., executable instructions), such as code for outputting 2335, code for obtaining 2340, and code for bundling 2345. Processing of the code for outputting 2335, code for obtaining 2340, and code for bundling 2345 may cause the communications device 2300 to perform the method 1700 described with respect to FIG. 17, or any aspect related to it; the method 1900 described with respect to FIG. 19, or any aspect related to it; and the method 2100 described with respect to FIG. 21, or any aspect related to it.

The one or more processors 2310 include circuitry configured to implement (e.g., execute) the code stored in the computer-readable medium/memory 2330, including circuitry such as circuitry for outputting 2315, circuitry for obtaining 2320, and circuitry for bundling 2325. Processing with circuitry for outputting 2315, circuitry for obtaining 2320, and circuitry for bundling 2325 may cause the communications device 2300 to perform the method 1700 described with respect to FIG. 17, or any aspect related to it; the method 1900 described with respect to FIG. 19, or any aspect related to it; and the method 2100 described with respect to FIG. 21, or any aspect related to it.

Various components of the communications device 2300 may provide means for performing the method 1700 described with respect to FIG. 17, or any aspect related to it; the method 1900 described with respect to FIG. 19, or any aspect related to it; and the method 2100 described with respect to FIG. 21, or any aspect related to it. For example, means for transmitting, sending, or outputting for transmission may include transceivers 354 and/or antenna(s) 352 of the UE 104 illustrated in FIG. 3 and/or the transceiver 2355 and the antenna 2360 of the communications device 2300 in FIG. 23. Means for receiving or obtaining may include transceivers 354 and/or antenna(s) 352 of the UE 104 illustrated in FIG. 3 and/or the transceiver 2355 and the antenna 2360 of the communications device 2300 in FIG. 23.

FIG. 24 depicts aspects of an example communications device 2400. In some aspects, communications device 2400 is a network entity, such as BS 102 of FIGS. 1 and 3, or a disaggregated base station as discussed with respect to FIG. 2.

The communications device 2400 includes a processing system 2405 coupled to the transceiver 2455 (e.g., a transmitter and/or a receiver) and/or a network interface 2465. The transceiver 2455 is configured to transmit and receive signals for the communications device 2400 via the antenna 2460, such as the various signals as described herein. The network interface 2465 is configured to obtain and send signals for the communications device 2400 via communication link(s), such as a backhaul link, midhaul link, and/or fronthaul link as described herein, such as with respect to FIG. 2. The processing system 2405 may be configured to perform processing functions for the communications device 2400, including processing signals received and/or to be transmitted by the communications device 2400.

The processing system 2405 includes one or more processors 2410. In various aspects, one or more processors 2410 may be representative of one or more of receive processor 338, transmit processor 320, TX MIMO processor 330, and/or controller/processor 340, as described with respect to FIG. 3. The one or more processors 2410 are coupled to a computer-readable medium/memory 2430 via a bus 2450. In certain aspects, the computer-readable medium/memory 2430 is configured to store instructions (e.g., computer-executable code) that when executed by the one or more processors 2410, cause the one or more processors 2410 to perform the method 1800 described with respect to FIG. 18, or any aspect related to it; the method 2000 described with respect to FIG. 20, or any aspect related to it; and the method 2200 described with respect to FIG. 22, or any aspect related to it. Note that reference to a processor of communications device 2400 performing a function may include one or more processors 2410 of communications device 2400 performing that function.

In the depicted example, the computer-readable medium/memory 2430 stores code (e.g., executable instructions), such as code for obtaining 2435, code for outputting 2440, and code for indicating 2445. Processing of the code for obtaining 2435, code for outputting 2440, and code for indicating 2445 may cause the communications device 2400 to perform the method 1800 described with respect to FIG. 18, or any aspect related to it; the method 2000 described with respect to FIG. 20, or any aspect related to it; and the method 2200 described with respect to FIG. 22, or any aspect related to it.

The one or more processors 2410 include circuitry configured to implement (e.g., execute) the code stored in the computer-readable medium/memory 2430, including circuitry such as circuitry for obtaining 2415, circuitry for outputting 2420, and circuitry for indicating 2425. Processing with circuitry for obtaining 2415, circuitry for outputting 2420, and circuitry for indicating 2425 may cause the communications device 2400 to perform the method 1800 described with respect to FIG. 18, or any aspect related to it; the method 2000 described with respect to FIG. 20, or any aspect related to it; and the method 2200 described with respect to FIG. 22, or any aspect related to it.

Various components of the communications device 2400 may provide means for performing the method 1800 described with respect to FIG. 18, or any aspect related to it; the method 2000 described with respect to FIG. 20, or any aspect related to it; and the method 2200 described with respect to FIG. 22, or any aspect related to it. Means for transmitting, sending, or outputting for transmission may include transceivers 332 and/or antenna(s) 334 of the BS 102 illustrated in FIG. 3 and/or the transceiver 2455 and the antenna 2460 of the communications device 2400 in FIG. 24. Means for receiving or obtaining may include transceivers 332 and/or antenna(s) 334 of the BS 102 illustrated in FIG. 3 and/or the transceiver 2455 and the antenna 2460 of the communications device 2400 in FIG. 24.

EXAMPLE CLAUSES

Implementation examples are described in the following numbered clauses:

Clause 1: A method for wireless communications at a UE, comprising: outputting, for transmission, a report comprising a PMI for a RI; and obtaining, based on the PMI, a CJT PDSCH having a rank, M, less than or equal to the RI.

Clause 2: The method of Clause 1, further comprising: obtaining, based on the PMI, a PDCCH.

Clause 3: The method of Clause 2, wherein obtaining the PDCCH is further based on a single column of a precoding matrix indicated by the PMI.

Clause 4: The method of Clause 3, further comprising: obtaining a multi-layer transmission, wherein the single column of the precoding matrix corresponds to a strongest layer of the multi-layer transmission.

Clause 5: The method of Clause 3, wherein the single column is indicated in a CORESET configuration of a CORESET via which the PDCCH was obtained.

Clause 6: The method of Clause 3, wherein the single column is based on a CORESET via which the PDCCH was obtained.

Clause 7: The method of any one of Clauses 1-6, further comprising: obtaining a configuration indicating the RI prior to outputting the report.

Clause 8: The method of any one of Clauses 1-7, further comprising: outputting, for transmission, a CSI report indicating the RI prior to outputting the report.

Clause 9: The method of any one of Clauses 1-8, wherein M is less than the RI; and the CJT PDSCH is obtained further based on the first M columns of a precoding matrix indicated by the PMI.

Clause 10: The method of any one of Clauses 1-9, further comprising: obtaining a multi-layer transmission; and outputting, for transmission, a report comprising an order of strengths of layers of the multi-layer transmission, wherein the CJT PDSCH is obtained further based on the M strongest layers, according to the order of strengths.

Clause 11: The method of any one of Clauses 1-10, further comprising: obtaining one or more first DM-RS with another channel that is associated with a first number of ports; and obtaining one or more second DM-RS with the CJT PDSCH, wherein: the CJT PDSCH is associated with a second number of ports; and the CJT PDSCH is obtained further based on the one or more first DM-RS bundled with the one or more second DM-RS.

Clause 12: The method of Clause 11, further comprising: obtaining an indication to bundle the first DM-RS with the second DM-RS.

Clause 13: A method for wireless communications at a UE, comprising: outputting, for transmission, a report comprising one or more PMIs, each PMI corresponding to a different RI; and obtaining a CJT PDSCH having a rank, M, wherein the PDSCH is obtained based on the PMI corresponding to the RI equal to M.

Clause 14: The method of Clause 13, further comprising: obtaining, based on the PMI corresponding to the RI indicating a rank of one, a PDCCH.

Clause 15: The method of any one of Clauses 13 and 14, further comprising: obtaining one or more first DM-RS with another channel that is associated with one or more ports; and obtaining one or more second DM-RS with the CJT PDSCH, wherein: the CJT PDSCH is also associated with the one or more ports; and the CJT PDSCH is obtained further based on the one or more first DM-RS bundled with the one or more second DM-RS.

Clause 16: A method for wireless communications at a UE, comprising: obtaining a TCI codepoint indicating a TCI state during a first slot; and obtaining one or more first coherent joint transmission (CJT) PDSCHs during one or more second slots after the first slot, wherein the one or more first CJT PDSCHs are obtained based on a first precoding matrix associated with the TCI state.

Clause 17: The method of Clause 16, further comprising: obtaining one or more first DM-RS with the one or more first CJT PDSCHs; obtaining one or more second DM-RS with one or more other channels; and bundling, based on the TCI codepoint, the one or more first DM-RS and the one or more second DM-RS, wherein the one or more first CJT PDSCHs are obtained based on the bundled two or more DM-RS.

Clause 18: The method of any one of Clauses 16 and 17, further comprising: obtaining the TCI codepoint during a third slot later than the one or more second slots; and obtaining one or more second CJT PDSCHs, during the third slot or a later slot, based on a second precoding matrix associated with the TCI state.

Clause 19: A method for wireless communications at a network entity, comprising: obtaining a report comprising a PMI for a RI; and outputting, for transmission and based on the PMI, a CJT PDSCH having a rank, M, less than or equal to the RI.

Clause 20: The method of Clause 19, further comprising: outputting, for transmission and based on the PMI, a PDCCH.

Clause 21: The method of Clause 20, wherein outputting the PDCCH is further based on a single column of a precoding matrix indicated by the PMI.

Clause 22: The method of Clause 21, further comprising: obtaining an indication of a strongest layer of a multi-layer transmission, wherein the single column of the precoding matrix corresponds to the strongest layer.

Clause 23: The method of Clause 21, further comprising: indicating the single column in a CORESET configuration of a CORESET via which the PDCCH is transmitted.

Clause 24: The method of Clause 21, wherein the single column is determined based on a CORESET via which the PDCCH is transmitted.

Clause 25: The method of any one of Clauses 19-24, further comprising: outputting, for transmission, a configuration indicating the RI prior to obtaining the report.

Clause 26: The method of any one of Clauses 19-25, further comprising: obtaining a CSI report indicating the RI prior to obtaining the report.

Clause 27: The method of any one of Clauses 19-26, wherein M is less than the RI; and the CJT PDSCH is output further based on the first M columns of a precoding matrix indicated by the PMI.

Clause 28: The method of any one of Clauses 19-27, further comprising: obtaining a report comprising an order of strengths of layers of a multi-layer transmission, wherein the CJT PDSCH is output further based on the M strongest layers, according to the order of strengths.

Clause 29: The method of any one of Clauses 19-28, further comprising: outputting, for transmission, an indication to bundle reference signals received with two or more channels associated with differing numbers of ports.

Clause 30: A method for wireless communications at a network entity, comprising: obtaining a report comprising one or more PMIs, each PMI corresponding to a different RI; and outputting, for transmission, a CJT PDSCH having a rank, M, and based on the PMI corresponding to the RI equal to M.

Clause 31: The method of Clause 30, further comprising: outputting, for transmission and based on the PMI corresponding to the RI indicating a rank of one, a PDCCH.

Clause 32: A method for wireless communications at a network entity, comprising: outputting, for transmission, a TCI codepoint indicating a TCI state during a first slot; and outputting, for transmission, one or more coherent joint transmission (CJT) PDSCHs during one or more second slots after the first slot, wherein the one or more CJT PDSCHs are output based on a precoding matrix associated with the TCI state.

Clause 33: The method of Clause 32, further comprising: outputting, for transmission, the TCI codepoint during a third slot later than the one or more second slots; and outputting, for transmission, one or more second CJT PDSCHs, during the third slot or a later slot, based on a second precoding matrix associated with the TCI state.

Clause 34: An apparatus, comprising: a memory comprising executable instructions; and a processor configured to execute the executable instructions and cause the apparatus to perform a method in accordance with any one of Clauses 1-33.

Clause 35: An apparatus, comprising means for performing a method in accordance with any one of Clauses 1-33.

Clause 36: A non-transitory computer-readable medium comprising executable instructions that, when executed by a processor of an apparatus, cause the apparatus to perform a method in accordance with any one of Clauses 1-33.

Clause 37: A computer program product embodied on a computer-readable storage medium comprising code for performing a method in accordance with any one of Clauses 1-33.

Clause 38: A user equipment (UE), comprising: at least one transceiver; a memory comprising processor-executable instructions; and one or more processors configured to execute the processor-executable instructions and cause the UE to perform a method in accordance with any one of Clauses 1-12, wherein the at least one transceiver is configured to transmit the report and receive the CJT PDSCH.

Clause 39: A user equipment (UE), comprising: at least one transceiver; a memory comprising processor-executable instructions; and one or more processors configured to execute the processor-executable instructions and cause the UE to perform a method in accordance with any one of Clauses 13-15, wherein the at least one transceiver is configured to transmit the report and receive the CJT PDSCH.

Clause 40: A user equipment (UE), comprising: at least one transceiver; a memory comprising processor-executable instructions; and one or more processors configured to execute the processor-executable instructions and cause the UE to perform a method in accordance with any one of Clauses 16-18, wherein the at least one transceiver is configured to receive the TCI codepoint and the one or more CJT PDSCHs.

Clause 41: A network entity, comprising: at least one transceiver; a memory comprising processor-executable instructions; and one or more processors configured to execute the processor-executable instructions and cause the network entity to perform a method in accordance with any one of Clauses 19-29, wherein the at least one transceiver is configured to receive the report and transmit the CJT PDSCH.

Clause 42: A network entity, comprising: at least one transceiver; a memory comprising processor-executable instructions; and one or more processors configured to execute the processor-executable instructions and cause the network entity to perform a method in accordance with any one of Clauses 30-31, wherein the at least one transceiver is configured to receive the report and transmit the CJT PDSCH.

Clause 43: A network entity, comprising: at least one transceiver; a memory comprising processor-executable instructions; and one or more processors configured to execute the processor-executable instructions and cause the network entity to perform a method in accordance with any one of Clauses 32-33, wherein the at least one transceiver is configured to transmit the TCI codepoint and the one or more first CJT PDSCHs.

ADDITIONAL CONSIDERATIONS

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The various illustrative logical blocks, modules and circuits described in connection with the present disclosure may be implemented or performed with a general purpose processor, a digital signal processor (DSP), an ASIC, a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, a system on a chip (SoC), or any other such configuration.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The methods disclosed herein comprise one or more actions for achieving the methods. The method actions may be interchanged with one another without departing from the scope of the claims. In other words, unless a specific order of actions is specified, the order and/or use of specific actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for". All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. An apparatus for wireless communication, comprising:
   at least one memory comprising processor-executable instructions; and
   at least one processor configured to execute the processor-executable instructions and cause the apparatus to:
      output, for transmission, a report comprising a precoding matrix indicator (PMI) corresponding to a rank indication (RI);

obtain a physical downlink control channel (PDCCH) based on a single column of a precoding matrix indicated by the PMI; and obtain, based on the PMI, a coherent joint transmission (CJT) physical downlink shared channel (PDSCH) having a rank, M, less than or equal to the RI.

2. The apparatus of claim 1, wherein the at least one processor is configured to execute the processor-executable instructions and further cause the apparatus to obtain a multi-layer transmission, wherein the single column of the precoding matrix corresponds to a strongest layer of the multi-layer transmission.

3. The apparatus of claim 1, wherein the at least one processor is configured to execute the processor-executable instructions and further cause the apparatus to determine the single column based on an indication in a control resource set (CORESET) configuration of a CORESET via which the PDCCH was obtained.

4. The apparatus of claim 1, wherein the at least one processor is configured to execute the processor-executable instructions and further cause the apparatus to determine the single column based on a control resource set (CORESET) via which the PDCCH was obtained.

5. The apparatus of claim 1, wherein the at least one processor is configured to execute the processor-executable instructions and further cause the apparatus to:
obtain a configuration indicating the RI prior to outputting the report.

6. The apparatus of claim 1, wherein the at least one processor is configured to execute the processor-executable instructions and further cause the apparatus to:
output, for transmission, a channel state information (CSI) report indicating the RI prior to outputting the report.

7. The apparatus of claim 1, wherein the at least one processor is configured to execute the processor-executable instructions and further cause the apparatus to obtain the CJT PDSCH further based on the first M columns of a precoding matrix indicated by the PMI, when M is less than the RI.

8. The apparatus of claim 1, wherein the at least one processor is configured to execute the processor-executable instructions and further cause the apparatus to:
obtain a multi-layer transmission;
output, for transmission, a report comprising an order of strengths of layers of the multi-layer transmission; and
obtain the CJT PDSCH further based on the M strongest layers, according to the order of strengths.

9. The apparatus of claim 1, wherein the at least one processor is configured to execute the processor-executable instructions and further cause the apparatus to:
obtain one or more first demodulation reference signals (DM-RS) with another channel that is associated with a first number of ports; and
obtain one or more second DM-RS with the CJT PDSCH, wherein the CJT PDSCH is associated with a second number of ports; and
obtain the CJT PDSCH further based on the one or more first DM-RS bundled with the one or more second DM-RS.

10. The apparatus of claim 9, wherein the at least one processor is configured to execute the processor-executable instructions and further cause the apparatus to:
obtain an indication to bundle the first DM-RS with the second DM-RS.

11. The apparatus of claim 1, further comprising at least one transceiver configured to transmit the report and receive the CJT PDSCH, wherein the apparatus is configured as a user equipment (UE).

12. An apparatus for wireless communication, comprising:
at least one memory comprising processor-executable instructions; and
at least one processor configured to execute the processor-executable instructions and cause the apparatus to:
output, for transmission, a report comprising one or more precoding matrix indicators (PMIs), each PMI corresponding to a different rank indication (RI);
obtain, based on the PMI corresponding to the RI indicating a rank of one, a physical downlink control channel (PDCCH);
obtain, based on the PMI corresponding to the RI equal to a rank M, a coherent joint transmission (CJT) physical downlink shared channel (PDSCH) associated with one or more antenna ports and having the rank M, by:
obtaining one or more first demodulation reference signals (DM-RSs) associated with another channel and the one or more antenna ports;
obtaining one or more second DM-RSs; and
bundling the one or more first DM-RSs and the one or more second DM-RSs.

13. The apparatus of claim 12, further comprising at least one transceiver configured to transmit the report and receive the CJT PDSCH, wherein the apparatus is configured as a user equipment (UE).

14. An apparatus for wireless communication, comprising:
at least one memory comprising processor-executable instructions; and
at least one processor configured to execute the processor-executable instructions and cause the apparatus to:
obtain a transmission control indicator (TCI) codepoint indicating a TCI state during a first slot; and
obtain one or more first coherent joint transmission (CJT) physical downlink shared channels (PDSCHs) during one or more second slots after the first slot, wherein the one or more first CJT PDSCHs are obtained based on a first precoding matrix associated with the TCI state.

15. The apparatus of claim 14, wherein the at least one processor is configured to execute the processor-executable instructions and further cause the apparatus to:
obtain one or more first demodulation reference signals (DM-RS) with the one or more first CJT PDSCHs;
obtain one or more second DM-RS with one or more other channels; and
bundle, based on the TCI codepoint, the one or more first DM-RS and the one or more second DM-RS, wherein the one or more first CJT PDSCHs are obtained based on the bundled two or more DM-RS.

16. The apparatus of claim 14, wherein the at least one processor is configured to execute the processor-executable instructions and further cause the apparatus to:
obtain the TCI codepoint during a third slot later than the one or more second slots; and
obtain one or more second CJT PDSCHs, during the third slot or a later slot, based on a second precoding matrix associated with the TCI state.

17. The apparatus of claim 14, further comprising at least one transceiver configured to receive the TCI codepoint and the one or more CJT PDSCHs, wherein the apparatus is configured as a user equipment (UE).

* * * * *